(12) United States Patent
Lin et al.

(10) Patent No.: US 10,346,951 B2
(45) Date of Patent: *Jul. 9, 2019

(54) IMAGE CROPPING SUGGESTION USING MULTIPLE SALIENCY MAPS

(71) Applicant: Adobe Inc., San Jose, CA (US)

(72) Inventors: Zhe Lin, Fremont, CA (US); Radomir Mech, Mountain View, CA (US); Xiaohui Shen, San Jose, CA (US); Brian L. Price, San Jose, CA (US); Jianming Zhang, Newton, MA (US); Anant Gilra, Sunnyvale, CA (US); Jen-Chan Jeff Chien, Saratoga, CA (US)

(73) Assignee: Adobe Inc., San Jose, CA (US)

( * ) Notice: Subject to any disclaimer, the term of this patent is extended or adjusted under 35 U.S.C. 154(b) by 215 days.

This patent is subject to a terminal disclaimer.

(21) Appl. No.: 15/448,138

(22) Filed: Mar. 2, 2017

(65) Prior Publication Data

US 2017/0178291 A1    Jun. 22, 2017

Related U.S. Application Data

(63) Continuation of application No. 14/511,001, filed on Oct. 9, 2014, now Pat. No. 9,626,584.

(51) Int. Cl.
*G06K 9/62* (2006.01)
*G06T 3/40* (2006.01)
(Continued)

(52) U.S. Cl.
CPC .............. *G06T 3/40* (2013.01); *G06K 9/4671* (2013.01); *G06T 3/0012* (2013.01); *G06T 11/60* (2013.01); *G06T 2210/22* (2013.01)

(58) Field of Classification Search
CPC .......... G06T 2210/22; G06T 7/11; G06T 7/12; G06T 7/00; G06T 2207/20132;
(Continued)

(56) References Cited

U.S. PATENT DOCUMENTS 6,034,740 A     3/2000  Mitsui et al.
6,535,639 B1 *  3/2003  Uchihachi ......... G06F 17/30799
                                          341/79
(Continued)

OTHER PUBLICATIONS

"Final Office Action", U.S. Appl. No. 14/511,001, dated Aug. 16, 2016, 12 pages.
(Continued)

*Primary Examiner* — Euengnan Yeh
(74) *Attorney, Agent, or Firm* — SBMC

(57) ABSTRACT

Image cropping suggestion using multiple saliency maps is described. In one or more implementations, component scores, indicative of visual characteristics established for visually-pleasing croppings, are computed for candidate image croppings using multiple different saliency maps. The visual characteristics on which a candidate image cropping is scored may be indicative of its composition quality, an extent to which it preserves content appearing in the scene, and a simplicity of its boundary. Based on the component scores, the croppings may be ranked with regard to each of the visual characteristics. The rankings may be used to cluster the candidate croppings into groups of similar croppings, such that croppings in a group are different by less than a threshold amount and croppings in different groups are different by at least the threshold amount. Based on the clustering, croppings may then be chosen, e.g., to present them to a user for selection.

20 Claims, 10 Drawing Sheets

(51) Int. Cl.
*G06K 9/46* (2006.01)
*G06T 3/00* (2006.01)
*G06T 11/60* (2006.01)

(58) Field of Classification Search
CPC ...... G06K 9/46; G06K 9/00234; G06K 9/629; G06K 9/4671; G06K 9/3233; G06K 2009/4666
See application file for complete search history.

(56) References Cited

U.S. PATENT DOCUMENTS

| | | | |
|---|---|---|---|
| 7,209,181 B2 | 4/2007 | Kriegman | |
| 7,400,761 B2 | 7/2008 | Ma | |
| 7,487,438 B1 | 2/2009 | Withers | |
| 7,630,525 B2 | 12/2009 | Sabe et al. | |
| 7,876,938 B2 | 1/2011 | Huang et al. | |
| 7,995,820 B2 | 8/2011 | Carneiro et al. | |
| 8,132,096 B1 | 3/2012 | Widdowson et al. | |
| 8,175,376 B2 | 5/2012 | Marchesotti et al. | |
| 8,213,741 B2* | 7/2012 | Sundareson | G06K 9/3233 348/333.05 |
| 8,515,131 B2 | 8/2013 | Koch et al. | |
| 8,602,791 B2 | 12/2013 | Weatherhead | |
| 9,454,712 B2 | 9/2016 | Lin et al. | |
| 9,626,584 B2 | 4/2017 | Lin et al. | |
| 2008/0122859 A1 | 5/2008 | Cazier et al. | |
| 2014/0172856 A1* | 6/2014 | Imbruce | G06F 17/212 707/737 |
| 2015/0116350 A1* | 4/2015 | Lin | G06T 11/60 345/620 |
| 2015/0117783 A1* | 4/2015 | Lin | G06K 9/4671 382/195 |
| 2015/0148677 A1 | 5/2015 | Mullick et al. | |
| 2016/0104054 A1 | 4/2016 | Lin et al. | |
| 2016/0104055 A1 | 4/2016 | Lin et al. | |

OTHER PUBLICATIONS

"Non-Final Office Action", U.S. Appl. No. 14/510,000, dated Nov. 18, 2015, 8 pages.
"Notice of Allowance", U.S. Appl. No. 14/510,000, dated May 6, 2016, 7 pages.
"Notice of Allowance", U.S. Appl. No. 14/511,001, dated Dec. 9, 2016, 9 pages.
"Pre-Interview Communication", U.S. Appl. No. 14/511,001, dated Jun. 1, 2016, 13 pages.
"Restriction Requirement", U.S. Appl. No. 14/511,001, dated Feb. 24, 2016, 5 pages.
"Supplemental Notice of Allowance", U.S. Appl. No. 14/510,000, dated Jun. 6, 2016, 4 pages.
"Supplemental Notice of Allowance", U.S. Appl. No. 14/511,001, dated Dec. 30, 2016, 2 pages.
Achanta,"Frequency-tuned Salient Region Detection", In: CVPR, IEEE (2009) 1597-1604, 2009, 8 pages, (published before this application Oct. 2014).
Cheng,"Efficient salient region detection with soft image abstraction", In: ICCV. (2013), 2013, 8 pages, (published before this application Oct. 2014).
Jiang,"Saliency Detection via Absorbing Markov Chain", In: ICCV. (2013), 2013, 8 pages, (published before this application Oct. 2014).
Vincent,"Morphological grayscale reconstruction in image analysis: applications and efficient algorithms", Image Processing, IEEE Transactions on 2 (1993) 176-201, Apr. 1993, pp. 176-201, (published before this application Oct. 2014).
Zhang,"Saliency Detection: A Boolean Map Approach", In: Proc. of the IEEE International Conference on Computer Vision (ICCV). (2013), 2013, 8 pages, (published before this application Oct. 2014).

* cited by examiner

IMAGE CROPPING SUGGESTION USING MULTIPLE SALIENCY MAPS

RELATED APPLICATION

This application is a continuation of and claims priority to U.S. patent application Ser. No. 14/511,001 filed Oct. 9, 2014 entitled "Image Cropping Suggestion Using Multiple Saliency Maps," the entirety of which is incorporated herein by reference.

BACKGROUND

Traditionally, people who used cameras for film photography were at least somewhat concerned about composing photos taken with such cameras to be visually pleasing. Once taken, there was little, if anything, people who did not develop their own film could do to improve their photos. Consequently, a photo that was not visually pleasing when taken generally resulted in a developed photo that also was not visually pleasing.

In digital photography, however, a photo that is not visually pleasing when taken may, through photo processing techniques, result in a visually pleasing (e.g., well-composed) photo. For example, a user with a digital camera may take a photo without being concerned generally about the composition of the photograph, such as whether the photo adheres to any of "the rules" of photography, e.g., rule-of-thirds, balancing elements, leading lines, and the like. Instead, the user may simply capture portions of a scene that they want to ensure are included in a final version of the photo. Given the digital photograph and a photo-editing application, a user may then perform a number of tasks to improve the photo, such as cropping the photo, adjusting the contrast of the photo, adjusting the brightness of the photo, adjusting the sharpness of the photo, applying a colored or black-and-white filter to the photo, and so on.

One of the most frequently performed tasks in photograph processing is cropping. Generally, the goal of cropping is to select a sub-region of a given image that is visually more pleasing than the image as a whole, e.g., a sub-region of the image that would be considered well-composed. However, users who are not familiar with "the rules" of photography, knowing when those rules may be broken, and/or who do not have a good "eye" for capturing a scene, may nevertheless crop an image so that the result is still not visually pleasing. Furthermore, manually cropping multiple photos may be time-consuming.

SUMMARY

Image cropping suggestion using multiple saliency maps is described. In one or more implementations, component scores, that are indicative of visual characteristics established for visually pleasing croppings, are computed for candidate image croppings using multiple different saliency maps. The visual characteristics on which the candidate image croppings are scored may be indicative of composition quality of a candidate cropping, whether content appearing in the scene is preserved by a candidate cropping, and simplicity of a boundary of a candidate cropping, for example. Based on the component scores, the croppings may be ranked with regard to each of the visual characteristics. The rankings may be used to cluster the candidate croppings into groups of similar croppings, such that the croppings in a group are different from one another by less than a threshold amount, but such that croppings in different groups are different from one another by at least the threshold amount.

Based on the clustering, croppings may then be chosen, e.g., to present the chosen croppings to a user for selection. To choose the croppings, they may be selected from different clusters. In this way, the croppings that are chosen for suggestion to a user may be different from one another by at least the threshold amount that is used to cluster the candidate croppings. Those croppings of a scene that are chosen may be suggested to a user through a user interface.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Overview

Figure 1:
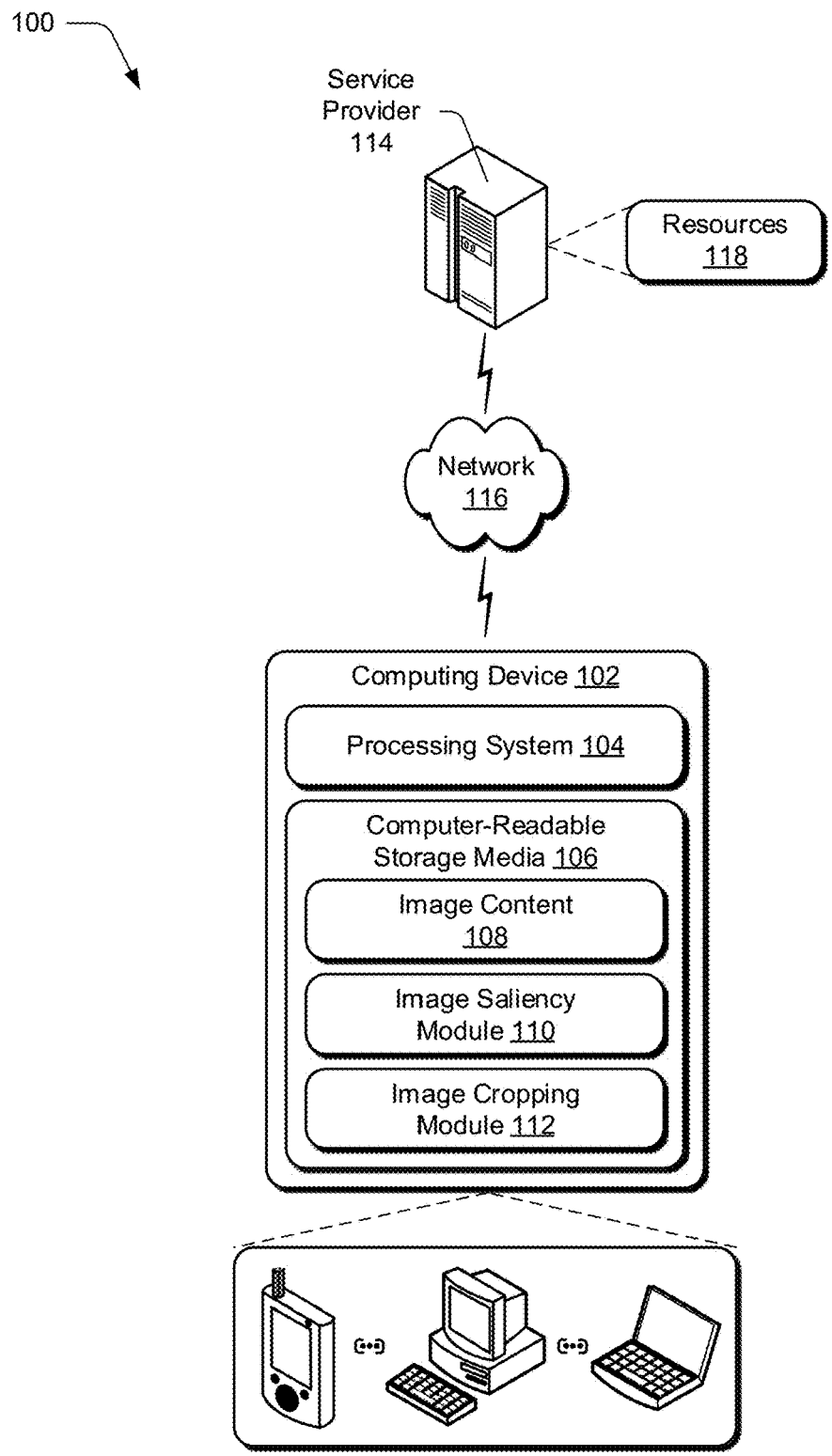
FIG. 1 is an illustration of an environment in an example implementation that is operable to employ techniques described herein.

Conventional techniques for cropping images may be time consuming for a user. Even if a user is willing to spend time manually cropping their photos, if the user is not familiar with "the rules" of photography, knowing when those rules may be broken, and/or does not have a good "eye" for capturing a scene, the resulting images may not be visually pleasing.

Image cropping suggestion using multiple saliency maps is described. In one or more implementations, a variety of image characteristics may be used to suggest candidate croppings of an image to a user. Images that are considered to be visually pleasing may have the characteristics that they are "well-composed" (e.g., generally adhere to "rules" of photography), preserve content of the image that is determined to be important, and have a boundary that is simpler than other potential boundaries (e.g., cuts through fewer objects). Accordingly, multiple croppings of an image may be analyzed with regard to such characteristics to determine how visually pleasing a particular cropping is relative to the other croppings.

Unlike conventional techniques which may perform image analysis using a single saliency map, the analysis of the image croppings may be performed using multiple saliency maps. By way of example, a variety of saliency maps may be used to compute scores indicative of composition quality, an amount of salient content preserved from the original image, and boundary simplicity of a particular cropping. A composition score may indicate the composition quality for the particular cropping. A content preservation score may indicate an extent to which salient content of the original image is preserved in the cropping. Further, a boundary simplicity score may indicate how simple the boundary of the cropping is compared to other candidate croppings. These scores may then be used to give the candidate croppings component rankings for each of the different scores, such that a cropping has a first ranking for the composition score, a second ranking for the content preservation score, and a third ranking for the boundary simplicity score. An average ranking of a cropping may then be determined based on the component rankings of the cropping.

Based on the average rankings of the candidate croppings, the croppings may be clustered and some croppings may be chosen from the clusters to suggest to a user. By clustering similar croppings together and choosing croppings from different clusters, a variety of visually different croppings may be chosen for suggestion to the user. To suggest the chosen croppings, a user interface may display cropping windows over an image that each correspond to a suggested cropping. In suggesting croppings for a scene that has yet to be captured, the cropping windows may be displayed over a portion of the interface through which the scene is viewed in real-time. In any case, a user may select a suggested cropping though the user interface. Responsive to the selection, the image may be cropped according to the selected cropping. When the selection is performed relative to a scene that has yet to be captured, the scene may be captured according to the selected cropping.

Image cropping suggestion using multiple saliency maps may also have a variety of other applications, such as to rate photographs taken by a user, to search for images that are similar (e.g., according to the visual characteristics mentioned above) to a given image, and so on.

In the following discussion, an example environment is first described that may employ the techniques described herein. Example implementation details and procedures are then described which may be performed in the example environment as well as other environments. Consequently, performance of the example procedures is not limited to the example environment and the example environment is not limited to performance of the example procedures.

Example Environment

FIG. 1 is an illustration of an environment 100 in an example implementation that is operable to employ techniques described herein. The illustrated environment 100 includes a computing device 102 having a processing system 104 that may include one or more processing devices (e.g., processors) and one or more computer-readable storage media 106. The illustrated environment 100 also includes image content 108, an image saliency module 110, and an image cropping module 112 embodied on the computer-readable storage media 106 and operable via the processing system 104 to implement corresponding functionality described herein. In at least some implementations, the computing device 102 may include functionality to access various kinds of web-based resources (content and services), interact with online providers, and so forth as described in further detail below.

The computing device 102 may be configured as any suitable type of computing device. For example, the computing device 102 may be configured as a server, a desktop computer, a laptop computer, a mobile device (e.g., assuming a handheld configuration such as a tablet or mobile phone), a tablet, a camera (point-and-shoot, single lens reflex (SLR), video recorder, and so on), a device configured to receive gesture input, a device configured to receive three-dimensional (3D) gestures as input, a device configured to receive speech input, a device configured to receive stylus-based input, a device configured to receive a combination of those inputs, and so forth. Thus, the computing device 102 may range from full resource devices with substantial memory and processor resources (e.g., servers, personal computers, game consoles) to a low-resource device with limited memory and/or processing resources (e.g., mobile devices). Additionally, although a single computing device 102 is shown, the computing device 102 may be representative of a plurality of different devices to perform operations "over the cloud" as further described in relation to FIG. 10.

The environment 100 further depicts one or more service providers 114, configured to communicate with computing device 102 over a network 116, such as the Internet, to provide a "cloud-based" computing environment. Generally speaking, service providers 114 are configured to make various resources 118 available over the network 116 to clients. In some scenarios, users may sign up for accounts that are employed to access corresponding resources from a provider. The provider may authenticate credentials of a user (e.g., username and password) before granting access to an account and corresponding resources 118. Other resources 118 may be made freely available, (e.g., without authentication or account-based access). The resources 118 can include any suitable combination of services and/or content typically made available over a network by one or more providers. Some examples of services include, but are not limited to, photo printing services (e.g., Snapfish®, Shutterfly®, and the like), photo storage and/or sharing services (e.g., Flickr®), social network services (e.g., Facebook®, Twitter®, Instagram®, and the like), and so forth.

These sources may serve as significant amounts of image content. Such image content may be formatted in any of a variety of image formats, including but not limited to JPEG, TIFF, RAW, GIF, BMP, PNG, and so on. The image content made available through the services may be posted by users that have accounts with those services. For example, a user having an account with a photo storage and/or sharing service may upload images, such as those taken with a digital camera of the user, or those sent to the user via electronic means. A user of the photo storage and/or sharing service may then share their uploaded images with others, such as by providing a link to photo albums or to a profile of the user.

The image saliency module 110 and image cropping module 112 may represent functionality to implement image cropping suggestion using multiple saliency map techniques described herein. For example, the image saliency module 110 may be configured in various ways to generate multiple different saliency maps for an image. For example, the image saliency module 110 may compute a base saliency map, a dense saliency map, a saliency edge map, a row-normalized gradient map, and image border (or cropping border) saliency maps for an image or a cropping.

Using these saliency maps, the image cropping module 112 may be configured in various ways to suggest image croppings of the image content 108 that are more visually pleasing than an original image. To do so, the image cropping module 112 may score multiple candidate croppings of an image according to visual characteristics of the candidate croppings. Images that are already determined to be visually pleasing are used to establish these visual characteristics. For example, at least some of the visual characteristics may be established by analyzing a collection of images that have been predefined as being visually pleasing. In contrast to conventional techniques which hard-code rules into a cropping algorithm, the image cropping module 112 may establish at least some of the visual characteristics using machine-learning techniques.

The characteristics of visually pleasing images may include that those images are well-composed, they preserve salient content appearing in the captured scene, and have relatively simple boundaries. Accordingly, the component scores that may be computed for a cropping include a component score that indicates a composition quality of a respective cropping, one that indicates whether salient content of the image is preserved by a respective cropping, and another that indicates a simplicity of a boundary of a respective cropping. To do so, the image cropping module 112 may be configured to use the saliency maps computed by the image saliency module 110.

Once the candidate croppings are scored, the image cropping module 112 may choose which of the candidate croppings are presented to a user. For example, the candidate croppings may be ranked according to the scores, and the highest ranked candidate cropping chosen. Other candidate croppings may also be chosen, such as another candidate cropping that is highly ranked but that, according to the scores over the parameters, is visually different from the highest ranked candidate cropping. To ensure a variety of visually different croppings, the image cropping module 112 may cluster croppings that are determined to be similar and select croppings for suggestion from the different clusters (rather than select images from a same cluster). In this way, the chosen candidate croppings may be used to suggest a variety of visually different, but visually pleasing (e.g., well-composed), croppings of an image.

Suggested croppings may be presented to a user through a user interface for selection. In a photo-editing application, for instance, the image content 108 (e.g., a digital image) may be accessed from storage and croppings of the image content 108 suggested through the user interface, e.g., by displaying windows over the image that each correspond to a suggested cropping. Through the user interface, the user may select one of the suggested croppings (e.g., one of the windows). As a result of the selection, the corresponding cropping may be applied to the image such that regions of the image outside the selected window are removed or hidden, and those within the window remain.

The image saliency module 110 and image cropping module 112 may be implemented as software modules, hardware devices, or using a combination of software, hardware, firmware, fixed logic circuitry, etc. Further, the image saliency module 110 and image cropping module 112 may be implemented as standalone components of the computing device 102 as illustrated. In addition or alternatively, the image saliency module 110 and image cropping module 112 may be configured as components of web services, applications, an operating system of the computing device 102, plug-in modules, or other device applications as further described in relation to FIG. 10.

Having considered an example environment, consider now a discussion of some example details of the techniques for image cropping suggestion using multiple saliency maps in accordance with one or more implementations.

Image Cropping Suggestion Using Multiple Saliency Maps Details

Figure 2:
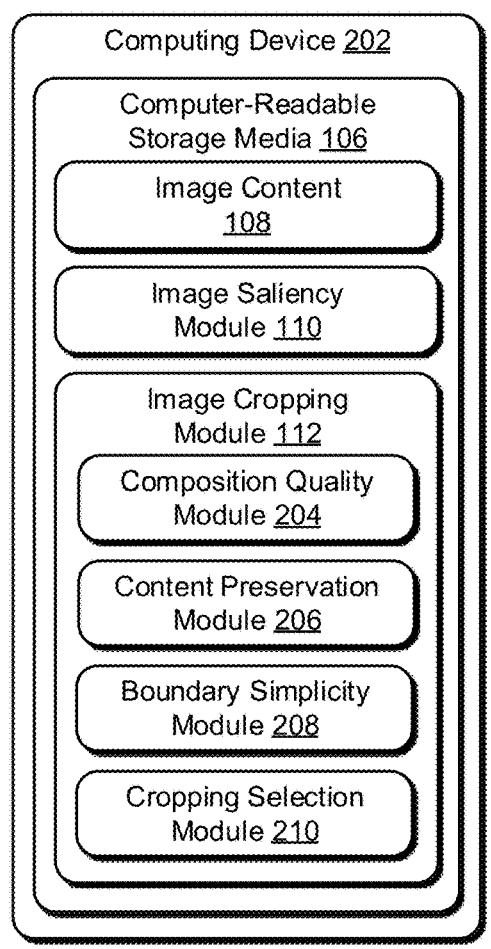
FIG. 2 illustrates from the environment of FIG. 1 a computing device having image saliency and image cropping modules in greater detail.

This section describes some example details of image cropping suggestion using multiple saliency map techniques in accordance with one or more implementations. FIG. 2 depicts generally at 200 some portions of the environment 100 of FIG. 1, but in greater detail. In particular, the computer-readable storage media 106 of a computing device and the components included therein are depicted in greater detail.

In FIG. 2, the computer-readable storage media 106 is illustrated as part of computing device 202 and includes the image content 108, the image saliency module 110, and the image cropping module 112. The image cropping module 112 is illustrated with a composition quality module 204, a content preservation module 206, a boundary simplicity module 208, and a cropping selection module 210. These modules represent functionality of the image cropping module 112 and it should be appreciated that such functionality may be implemented using more or fewer modules than those illustrated.

In general, the image saliency module 110 is configured to compute saliency maps for an image as well as for portions thereof, e.g., candidate croppings. For example, the image saliency module 110 may compute a base saliency map, a dense saliency map, a saliency edge map, a row-normalized gradient map, and image border (or cropping border) saliency maps for an image or a cropping. To do so, the image saliency module 110 may not only compute the saliency maps in a pixel-wise manner, based on the Euclidean distance between a pixel and sample mean in a given color space (e.g., RGB color space), but may also leverage feature space whitening and boundary prior information.

In general, the image cropping module 112 may employ the composition quality module 204, the content preservation module 206, and the boundary simplicity module 208 to score an image cropping over visual characteristics of the cropping. To compute the component scores for a candidate cropping, these modules may utilize the saliency maps generated by the image saliency module 110. Prior to scoring the image croppings, however, the image cropping module 112 may derive multiple croppings to be scored.

For a particular image, the image cropping module 112 may derive multiple image croppings at different sizes and aspect ratios. For example, the image cropping module 112 may derive image croppings for commonly used photograph sizes, such as image croppings for 3×5 inches, 4×6 inches, 5×7 inches, and the like. The image cropping module 112 may also derive image croppings for commonly used aspect ratios, such as 4:3, 16:9, 1:1, and the like. Instead of deriving multiple different sized croppings, the image cropping module 112 may derive multiple different image croppings that each have a same size e.g., each of the image croppings may have a size of 3×5 inches. It is to be appreciated that the image cropping module 112 may derive image croppings at sizes and aspect ratios other than those enumerated above without departing from the spirit and the scope of the techniques described herein. With the techniques described herein, the image cropping module 112 may also derive image croppings for a variety of shapes, including rectangles (e.g., at the sizes and aspect ratios mentioned above), circles, triangles, ovals, and other different shapes.

Further, the image cropping module 112 may derive the multiple image croppings according to user selections. Through a user interface, for instance, a user may select to have multiple image croppings derived at different sizes. A user may also select through the user interface to have multiple image croppings derived at a same size. Alternately or in addition, the user interface may enable a user may specify a shape (square, circle, rectangle, user drawn, and so on) according to which an image is cropped. In some implementations, the image cropping module 112 may derive the multiple image croppings without user input to specify how a user would like an image cropped. For example, the image cropping module may derive multiple different sized croppings (or multiple croppings of a same size) of an image automatically, such as according to default settings. The multiple croppings derived from an image may be considered "candidate" croppings because some of those croppings may eventually be chosen to present to a user while others are not.

Given multiple croppings of an image, the image cropping module 112 may employ the cropping selection module 210 to select and suggest one or more of those croppings, e.g., by presenting them through a user interface. As mentioned briefly above and described in more detail below, the image cropping module 112 may employ the composition quality module 204, the content preservation module 206, and the boundary simplicity module 208 to score each of the croppings derived from a given image. Once the multiple croppings are scored, the cropping selection module 210 may compute rankings for each of the croppings based on the component scores.

Having discussed the general functionality of the image saliency module 110, the image cropping module 112, the composition quality module 204, the content preservation module 206, the boundary simplicity module 208, and the cropping selection module 210, some details of these modules are now discussed.

The Image Saliency Module

The image saliency module 110 represents functionality to process an image to compute multiple saliency maps of the image that can be used for salient object detection. To compute the saliency maps, the image saliency module 110 is configured to designate and analyze boundary regions of the image.

Figure 3:
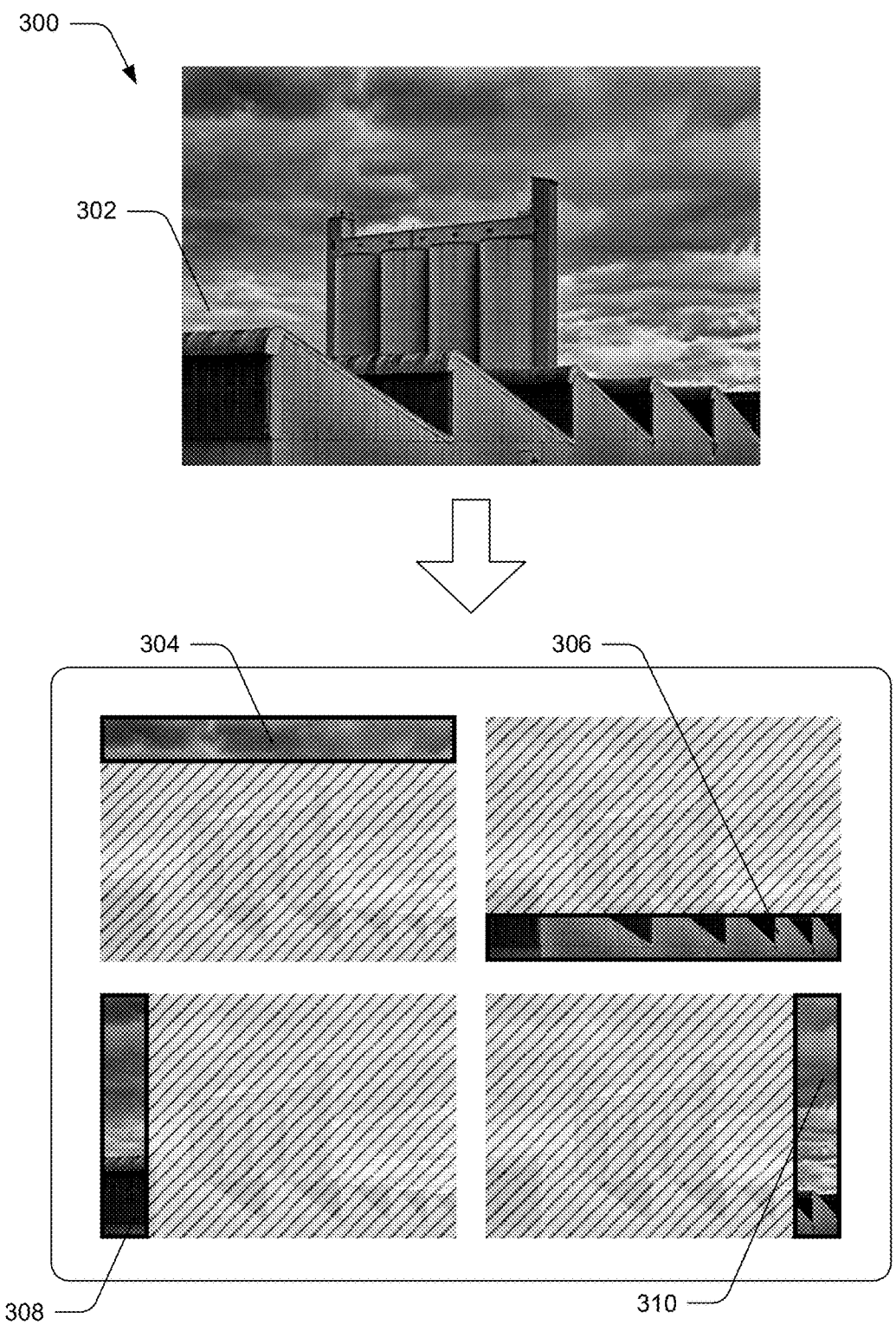
FIG. 3 illustrates an example of an image and boundary regions that may be determined for computing saliency maps for the image.

FIG. 3 illustrates at 300 an example of an input image and boundary regions that may be helpful in discussing the image saliency module 110. In particular, FIG. 3 depicts input image 302 and boundary regions 304, 306, 308, 310, which the image saliency module 110 may analyze to compute the saliency maps. Boundary region 304 corresponds to a top boundary of the image 302, boundary region 306 corresponds to a bottom boundary of the image 302, boundary region 308 corresponds to a left boundary of the image 302, and boundary region 310 corresponds to a right boundary of the image 302.

Given the input image 302, the image saliency module 110 is configured to resize the input image 302 to a predefined size. In one or more implementations, the input image 302 may be an RGB color image. The term "RGB" refers to an additive color model in which red, green, and blue light are added together in various ways to produce a broad array of colors. In addition to resizing the input image 302, the image saliency module 110 is configured to smooth the input image 302, such as by using a two-dimensional Gaussian kernel.

For each of the four boundary regions 304, 306, 308, 310, the image saliency module 110 is configured to compute a sample mean $\bar{x}=[\bar{x}_1, \bar{x}_2, \bar{x}_3]$ and sample covariance matrix $Q=[q_{ij}]_{3\times 3}$ using the pixels of the region. The image saliency module 110 may compute the sample mean for a boundary region, using the pixels in the region, as follows:

$$\bar{x}_i = \frac{1}{N}\sum_{k=1}^{N} x_i^k$$

The image saliency module 110 may compute the covariance matrix for a boundary region, using the pixels in the region, as follows:

$$q_{ij} = \frac{1}{N}\sum_{k=1}^{N} (x_i^k - \bar{x}_i)(x_j^k - \bar{x}_j)$$

In these equations N represents the number of pixels in the region. The term $x^k=[x_1^k, x_2^k, x_3^k]$ represents the RGB color value of the $k^{th}$ pixel in the region. The term $q_{ij}$ represents an element in the covariance matrix Q, the dimensions of which are three by three due to the three color channels of the RGB color model. It should be appreciated that the techniques described herein may be implemented using a different color model though. When a different color model is used, the covariance matrix may have different dimensions corresponding to the color model used.

With the sample mean and covariance matrix computed for a region, the image saliency module 110 may compute an intermediate saliency map $U=[u^{ij}]$ based on the whitened Euclidean distance from the sample mean according to the following:

$$u^{ij} = \sqrt{(x^{ij}-\bar{x})Q^{-1}(x^{ij}-\bar{x})^T}$$

In this equation, the term $x^{ij}$ represents the RGB color value of the pixel at the $i^{th}$ row and $j^{th}$ column of the region. The Euclidean distance may be transformed by a whitening transformation, and thus considered "whitened". A whitening transformation is a decorrelation transformation that transforms a set of random variables, having a known covariance matrix (e.g., in this case Q), into a set of new random variables for which the covariance is the identity matrix. In this way, the image saliency module 110 may leverage the covariance computed for each boundary region of the input image 302. In a whitened color space, the Euclidean distance from the sample mean represents the distinctiveness of a given pixel to a greater degree than do other measures. This advantage results from the coordinates of the whitened space being decorrelated and normalized.

Once the intermediate saliency map U is computed, it may be scaled by the image saliency module 110. For example, the image saliency module 110 may scale the intermediate saliency map $U=[u^{ij}]$ according to the following:

$$u^{ij} \leftarrow \frac{u^{ij}}{\max_{ij} u^{ij}}.$$

Given the computed intermediate saliency maps for each of the four regions, the image saliency module 110 may compute a base saliency map $S=[s^{ij}]$ using the intermediate saliency maps. For example, the image saliency module 110 may compute the base saliency map according to the following:

$$s^{ij} = \left(\sum_{k=1}^{4} u_k^{ij}\right) - \max_k u_k^{ij}$$

In this equation, $\{U_k: k=1, 2, 3, 4\}$ where "1" corresponds to the boundary region 304 (top boundary of the image 302), "2" corresponds to the boundary region 306 (bottom boundary of the image 302), "3" corresponds to the boundary region 308 (left boundary of the image 302), and "4" corresponds to the boundary region 310 (right boundary of the image 302). Thus, the image saliency module 110 integrates the intermediate saliency map of each boundary regions 304, 306, 308, 310 to compute the base saliency map for the input image 302. Moreover, subtraction of the term $$\max_k u_k^{ij}$$

is effective to suppress an effect on the base saliency map of foreground objects that occupy a majority of one of the boundary regions. In this way, a foreground object occupying a majority of one of the boundary regions does not have undue influence on generation of the base saliency map.

This technique of computing a saliency map for an image is based in part on the observation that distributions of background pixels near an image boundary are highly correlated across natural images. By computing a set of sample means and covariances for the boundary regions 304, 306, 308, 310 the image saliency module 110 leverages this boundary prior. Moreover, by leveraging the feature space whitening and the boundary prior, the techniques described herein generate saliency maps that are better suited for some purposes (e.g., eye fixation prediction, salient object segmentation, and automatic image cropping) than techniques in which a saliency map is generated in a pixel-wise manner but which is based on just the Euclidean distance between a pixel and the sample mean in the color space.

Once the base saliency map S is computed from the intermediate saliency maps of the boundary regions 304, 306, 308, 310, the base saliency map may be scaled by the image saliency module 110. By way of example, the image saliency module 110 may scale the base saliency map $S=[s^{ij}]$ according to the following:

$$u^{ij} \leftarrow \frac{u^{ij}}{\max_{ij} u^{ij}}.$$

In addition to scaling the base saliency map according to the formula, the image saliency module 110 may also resize the base saliency map so that it is the same size as the original input image 302.

In one or more implementations, the image saliency module 110 may also perform post-processing on the base saliency map to generate an enhanced saliency map. The enhanced saliency map may be considered "enhanced" because it results from optionally applying morphological post-processing techniques to the base saliency map computed by the image saliency module 110. The image saliency module 110 may compute the enhanced saliency map S' by taking a morphological erosion of the base saliency map S to result in a morphologically eroded version $S_{erode}$ of the base saliency map. In general, morphological erosion refers to an operation in which boundaries of regions of foreground pixels are eroded away so that areas of foreground pixels shrink in size, and holes within those areas become larger.

Continuing with the post-processing operations, the image saliency module 110 may then perform morphological image reconstruction by dilation using the base saliency map S as a mask and $S_{erode}$ as a marker to get a morphologically reconstructed version $\tilde{S}$ of the base saliency map. In general, morphological image reconstruction refers to repeating dilations of the marker image until the contour of the marker image fits under the mask image. In morphological reconstruction, the peaks in the marker image "spread out" or dilate such that each successive dilation of the marker image is constrained to lie underneath the mask. When further dilation ceases to change the image, the technique stops and the final dilation is the reconstructed image.

As part of the post-processing, the image saliency module 110 may generate a dilated version $\tilde{S}_{dilate}$ of the saliency map by taking a morphological dilation of $\tilde{S}$. In general, morphological dilation refers to an operation that is the dual operation of erosion. To illustrate morphological dilation, consider an example in which text is dilated. Dilation of the text would cause the text to appear as if it were written with a thicker pen. Given the dilated version of the saliency map $\tilde{S}_{dilate}$, the image saliency module 110 may then perform morphological image reconstruction by erosion using the morphologically reconstructed version $\tilde{S}$ as a mask and the dilated version $\tilde{S}_{dilate}$ as a marker. The result of this image reconstruction by erosion, and thus the series of post-processing operations, is the "enhanced" saliency map S'.

The image saliency module 110 also represents functionality to combine single-channel saliency maps with a saliency map of a given color space (e.g., RGB). The techniques described above for computing the base saliency map S do so for a color space, such as the RGB color space. However, these techniques may result in a base saliency map S that highlights sparse areas of the input image 302. Some applications may be configured to use as input saliency maps that highlight at least a threshold amount of area. When the area highlighted in the base saliency map S is sparse (e.g., less than a threshold of highlighted area) the image saliency module 110 may combine single channel saliency maps to highlight more area of the input image, e.g., to generate a dense saliency map as described in more detail below.

Figure 4:
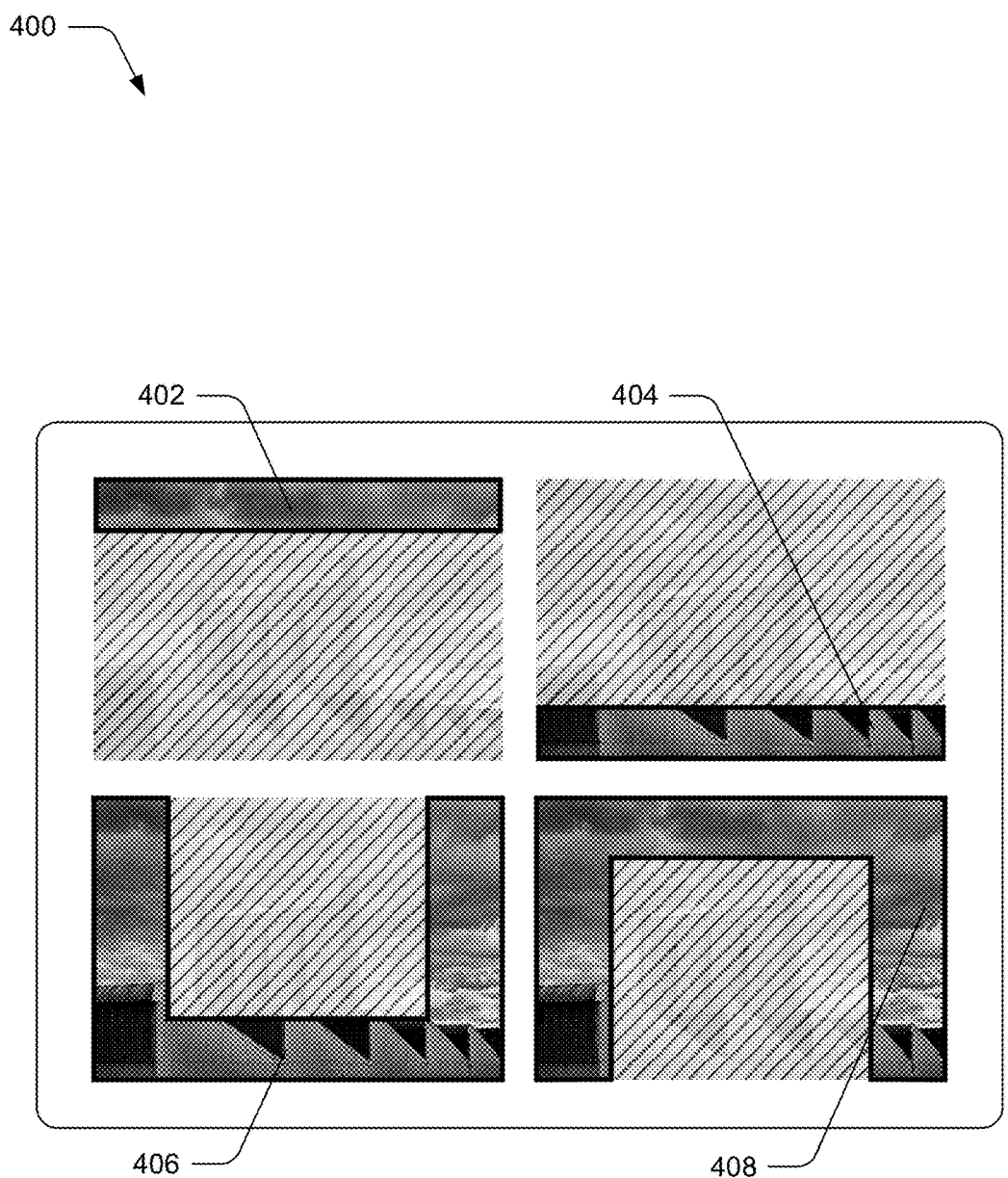
FIG. 4 illustrates an example of alternate combinations of boundary regions that may be used to compute saliency maps for the image depicted in FIG. 3

In one or more implementations, the image saliency module 110 is configured to use alternative image boundary region combinations. FIG. 4 illustrates an example at 400 of alternative boundary region combinations that may be used to compute the base image saliency map. Instead of using the boundary regions 304, 306, 308, 310 of input image 302, boundary regions 402, 404, 406, 408, which represent different combinations of the boundary regions 304, 306, 308, 310, may be used to compute the base saliency map S. The boundary regions 402, 404, 406, 408 may be configured to suppress uniform regions in the upper and lower parts of the image, which in natural images often correspond to the sky and land.

It should be contemplated that the boundary regions used to compute the saliency map may be configured in different shapes and sizes than the boundary regions 304, 306, 308, 310, 402, 404, 406, 408 without departing from the spirit and the scope of the techniques described herein. By way of example and not limitation, the boundary regions may be non-rectangularly shaped, the boundary regions may be sized based on an analysis of the image (e.g., one that determines how much of the image corresponds to sky or land), and so forth.

To perform their corresponding functions, the composition quality module 204, the content preservation module 206, and the boundary simplicity module 208 are each configured to utilize these saliency maps computed by the image saliency module 110. At least some of these modules may utilize the intermediate saliency maps computed for each of the boundary regions, for example. These modules may also be configured to perform their corresponding functions utilizing other maps that are based on the above-described saliency maps. Accordingly, the image saliency module 110 also represents functionality to compute these other maps, which include a dense saliency map, a saliency edge map, and a row-normalized gradient map.

To compute the dense saliency map $S_d$, the image saliency module 110 computes a single-channel saliency map for each channel of the color space, e.g., for the RGB color space a saliency map is computed for each of the red channel, the green channel, and the blue channel. These saliency maps are computed in a similar manner to that which is discussed above for the entire color space. Once the saliency maps for each channel of the color space are computed, the image saliency module 110 may combine those maps with the base saliency map S to compute the dense saliency map $S_d$ according to the following:

$$S_d = \frac{3S + S_R + S_G + S_B}{6}$$

In this example, it is assumed that the input image 302 is an RGB image. Consequently, the term $S_R$ represents the saliency map computed for the red channel, $S_G$ represents the saliency map computed for the green channel, and $S_B$ represents the saliency map computed for the blue channel. This summation is carried out in a pixel-wise manner. Further, the saliency map S is combined with the single-channel saliency maps (e.g., $S_R$, $S_G$, $S_B$) using a weighted average. Although the saliency map computed for the entire color space is given a weight of three, it should be appreciated that the terms may be weighted differently without departing from the scope of the techniques described herein.

Given the dense saliency map $S_d$, the image saliency module 110 may compute a saliency edge map $S_e$. The saliency edge map $S_e$ captures information about salient edges of the image for which it is computed, such as the input image 302. To compute the saliency edge map $S_e$, the image saliency module 110 takes a pixel-wise multiplication of the dense saliency map $S_d$ and a gradient magnitude map E of the input image 302 according to the following:

$$S_e = S_d \odot E$$

The pixel-wise multiplication is denoted by the operator $\odot$. In general, a gradient magnitude indicates how quickly an image is changing. Thus, a gradient magnitude map (e.g., the gradient magnitude map E) indicates, for each pixel in the input image, how quickly the image is changing at the given pixel. The change determined for each pixel of a gradient magnitude map may be indicated using a vector, for example.

To compute the row-normalized gradient map G, the gradient magnitude map E is again used. First, the values of the gradient magnitude map E are compared to a threshold. If a value is less than the threshold, it is then set to zero. Then for each row of the gradient magnitude map, the image saliency module 110 performs a normalization according to the following:

$$g_{ij} = \frac{e_{ij}}{\epsilon + \Sigma_j e_{ij}}$$

Here, the terms $g_{ij}$ and $e_{ij}$ represent the pixel values at the $i^{th}$ row and $j^{th}$ column of the row-normalized gradient map G and the gradient magnitude map E respectively. The term $\epsilon$ represents a relatively small constant that is effective to avoid division by zero. Once the normalization is performed, the image saliency module 110 may compare the pixel values of the row-normalized gradient map G to a second threshold. For pixels having a value below the threshold, the image saliency module 110 may change the value of such pixels to zero. In addition, the image saliency module 110 may apply a morphological opening operation to the row-normalized gradient map G. In general, morphological opening is effective to remove small objects from the foreground of an image (e.g., usually taken as dark pixels) and place them in the background. In contrast, closing removes small holes in the foreground, changing small regions of background into foreground.

Having discussed the functionality of the image saliency module 110 to compute various saliency maps and maps based thereon, a discussion of the modules that utilize those maps follows.

The Composition Quality Module

The composition quality module 204 represents functionality to determine a composition quality of a respective cropping. To determine a composition quality of a cropping, the composition quality module 204 may utilize a classifier that is trained to recognize features of well-composed images. Rather than hard-coding general cropping rules (e.g., the rule-of-thirds, balancing elements, leading lines, and so on), rules may be mined from a data set of professional photographs that are already determined to be well-composed. Given a data set D of well-composed professional photos, the classifier may extract not only rules (e.g., the rule-of-thirds, balancing elements, leading lines, and so on) from those photos, but also knowledge as to when those rules may be broken. Using a large set of photos that are already determined to be well-composed to train the classifier also has the advantage of being able to avoid using human cropped photos, which are expensive to acquire in terms of both time and resources.

These rules and the knowledge about when those rules may be broken are extracted from the data set D as features that are represented by vectors. The features extracted from well-composed photos are considered to be positive examples of those features. In contrast, features extracted from random croppings of the well-composed photos are considered to be negative examples of those features. In any case, both positive and negative feature examples may be represented by respective vectors. The vectors derived for each of the features of each image in the training set and for the random croppings may then feed a support vector regression model.

In contrast to techniques that determine composition quality from a single saliency map, the techniques for image cropping suggestion using multiple saliency maps may use multiple different saliency maps to determine composition quality of a cropping. In particular, the composition quality module 204 may use a dense saliency map $S_d$ and a saliency edge map $S_e$.

To do so, the composition quality module 204 may use the dense saliency map and the saliency edge map to extract spatial-pyramid features for the croppings. The composition quality module 204 may average the saliency values in each cell of the dense saliency map and the saliency edge map. In one example, two levels of a spatial-pyramid are built for the dense saliency map, each splitting the portion of the image corresponding to the candidate cropping into grids of 4×4 and 8×8 areas. For the saliency edge map, three levels of a spatial-pyramid are built, each splitting the portion of the image corresponding to the candidate cropping into grids of 2×2, 4×4, and 8×8 areas. The composition quality module 204 may then combine the spatial-pyramids extracted for the dense saliency map and the saliency edge map into a single feature vector.

Using the model (e.g., the support vector regression model), candidate croppings may be scored according to the features present in a candidate cropping. The presence of positive features in a candidate cropping may be effective to increase its composition score, while the presence of negative features may be effective to decrease its composition score. Given feature vector $v_i$, which results from the concatenation of the extracted spatial-pyramids, a composition score $S_{comp}^i$ for a cropping may be computed as follows:

$$S_{comp}^i = v_i \cdot w + b$$

In this equation, w represents a weight vector and b represents a bias in the model. Although a vector regression model is discussed, other models capable of identifying features indicative of a well-composed photo and features indicative of a photo that is not well-composed may be used within the spirit and the scope of the techniques described herein. For example, a neural network may be used in addition to or instead of the vector regression model.

Although training the classifier using a large data set of well-composed photos is discussed above, a classifier may be updated with a user's own photos, or with photos that a user likes e.g., those of a friend whose photography the user admires, or a professional photographer whose photograph the user admires. In this way, the classifier utilized by the composition quality module 204 may be trained to recognize features similar to those in images the user likes. Consequently, the presence of such features in a cropping may increase its composition score.

Figure 5:
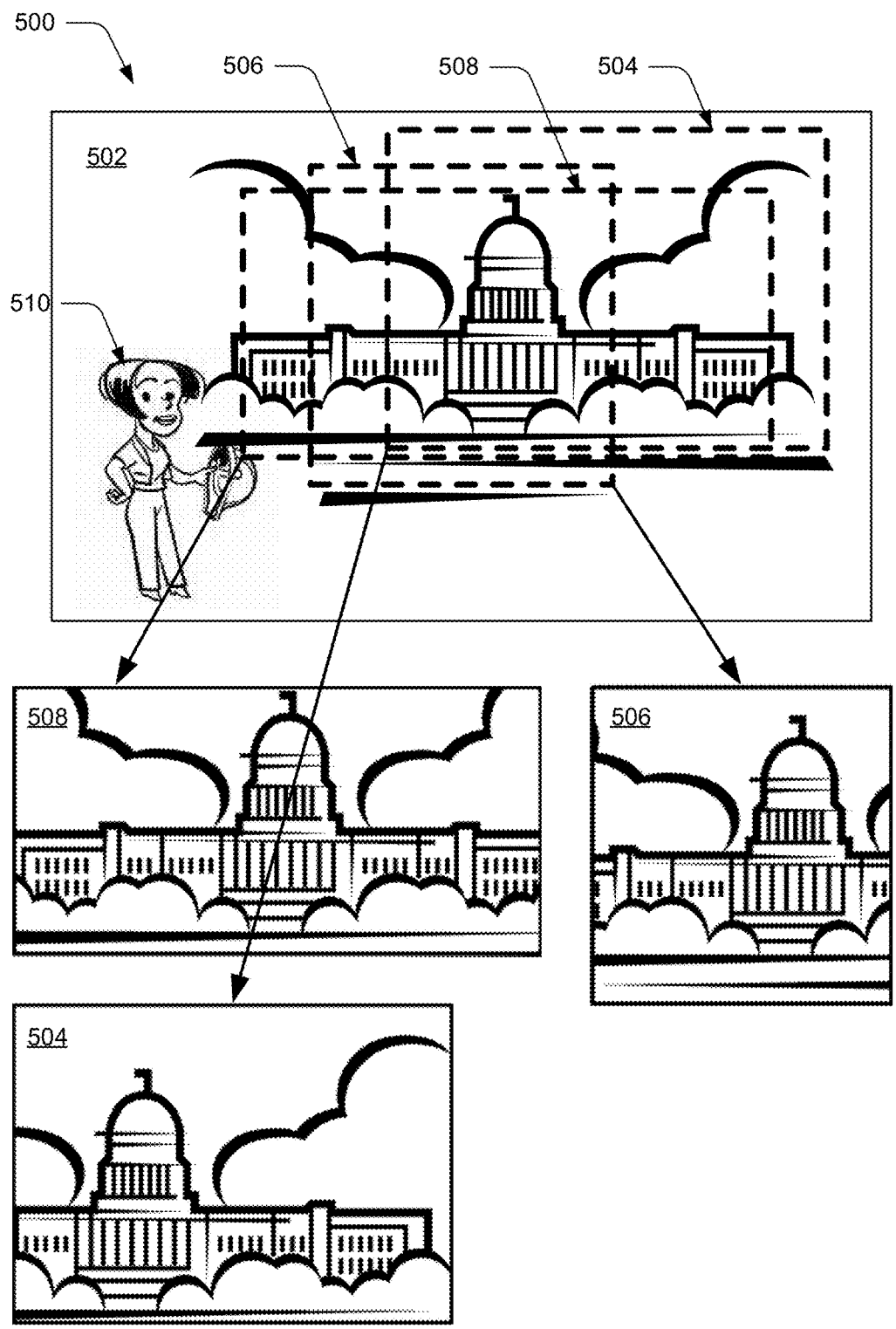
FIG. 5 illustrates an example of an image and croppings that may be derived from the image based on composition quality characteristics.

FIG. 5 illustrates at 500 an example of an image and croppings that may be derived from the image based on composition quality characteristics. In particular, FIG. 5 depicts image 502, and croppings 504, 506, 508. Utilizing a classifier such as that discussed above, the composition quality module 204 may compute composition scores for multiple croppings derived from the image 502. The model to which the multiple croppings are compared may indicate that croppings 504, 506, 508 exhibit features indicative of well-composed photos. For example, the croppings 504, 506, 508 may adhere generally to rules learned from a training data set of photos determined to be well-composed. Although the croppings 504, 506, 508 may adhere to the rules learned from the training set, and thus be considered "well-composed", each of the croppings 504, 506, 508 is missing person 510, which may be a salient feature of image 502. To ensure salient features of an image are included in croppings, content preservation techniques may be employed.

Content Preservation Module

The content preservation module 206 represents functionality to determine whether an image cropping preserves salient content of a respective image cropping. To determine whether salient content in an image is preserved, the content preservation module 206 may determine which features in an image correspond to salient content, e.g., people included in an image.

In contrast to techniques that use just a single saliency map to determine whether a cropping preserves salient content of an image, the techniques described herein may use multiple different saliency maps. By way of example, the content preservation module 206 may use a base saliency map S and a dense saliency map $S_d$ to score an image cropping based on salient content of the image that is preserved.

To do so, the content preservation module 206 may threshold small values of the base saliency map S to derive a thresholded base saliency map $\hat{S}$. The content preservation module 206 may also threshold small values of the dense saliency map to derive a thresholded dense saliency map $\hat{S}_d$. Based on the thresholded saliency map $\hat{S}$, the thresholded dense saliency map $\hat{S}_d$, and a row-normalized gradient map G of an image, the content preservation module 206 may compute a content preservation score $S_{CP}^i$ of a candidate cropping $C_i$ of the image as follows:

$$S_{CP}^i = \alpha_1 \frac{\sum_{p \in C_1} \hat{S}(p)}{\sum_{p \in K} \hat{S}(p)} + \alpha_2 \frac{\sum_{p \in C_1} \hat{S}_d(p)}{\sum_{p \in K} \hat{S}_d(p)} + \alpha_3 \frac{\sum_{p \in C_1} G(p)}{\sum_{p \in K} G(p)}$$

The content preservation score $S_{CP}^i$ represents a weighted sum of ratios in which each is a ratio of a candidate cropping $C_i$'s salient content as determined from a respective map to the original image's salient content determined from the respective map. In the equation, for example, the first ratio is of candidate image cropping $C_i$'s salient content determined from the thresholded base saliency map $\hat{S}$ to the original image's salient content determined from the thresholded base saliency map $\hat{S}$. The second ratio, however, is of candidate image cropping $C_i$'s salient content determined from the thresholded dense saliency map $\hat{S}_d$ to the original image's salient content determined from the thresholded dense saliency map $\hat{S}_d$. It follows then that the third ratio is of candidate image cropping $C_i$'s salient content determined from the row-normalized gradient map G to the original image's salient content determined from the row-normalized gradient map G.

The terms $\alpha_1$, $\alpha_2$, $\alpha_3$ represent pre-defined constants by which each respective ratio is weighted. The term p denotes the index of a pixel and the term K represents the overall pixel index set of the image from which the candidate cropping is taken. By including the content preservation score as one of the parameters for calculating a cropping's score, important content of the original image may be preserved in suggested croppings.

By computing the content preservation score in this way, the content preservation module 206 may preserve the tips of objects to a greater degree than conventional techniques. A "tip" of an object may refer to a portion of an object that sticks out relative to the rest of the object and may be thinner than the rest of the object. Examples of object tips include the tip of the Eiffel Tower, the tail of a cat (e.g., a tiger), an arm that is extended from a person's body, and so on.

Figure 6:
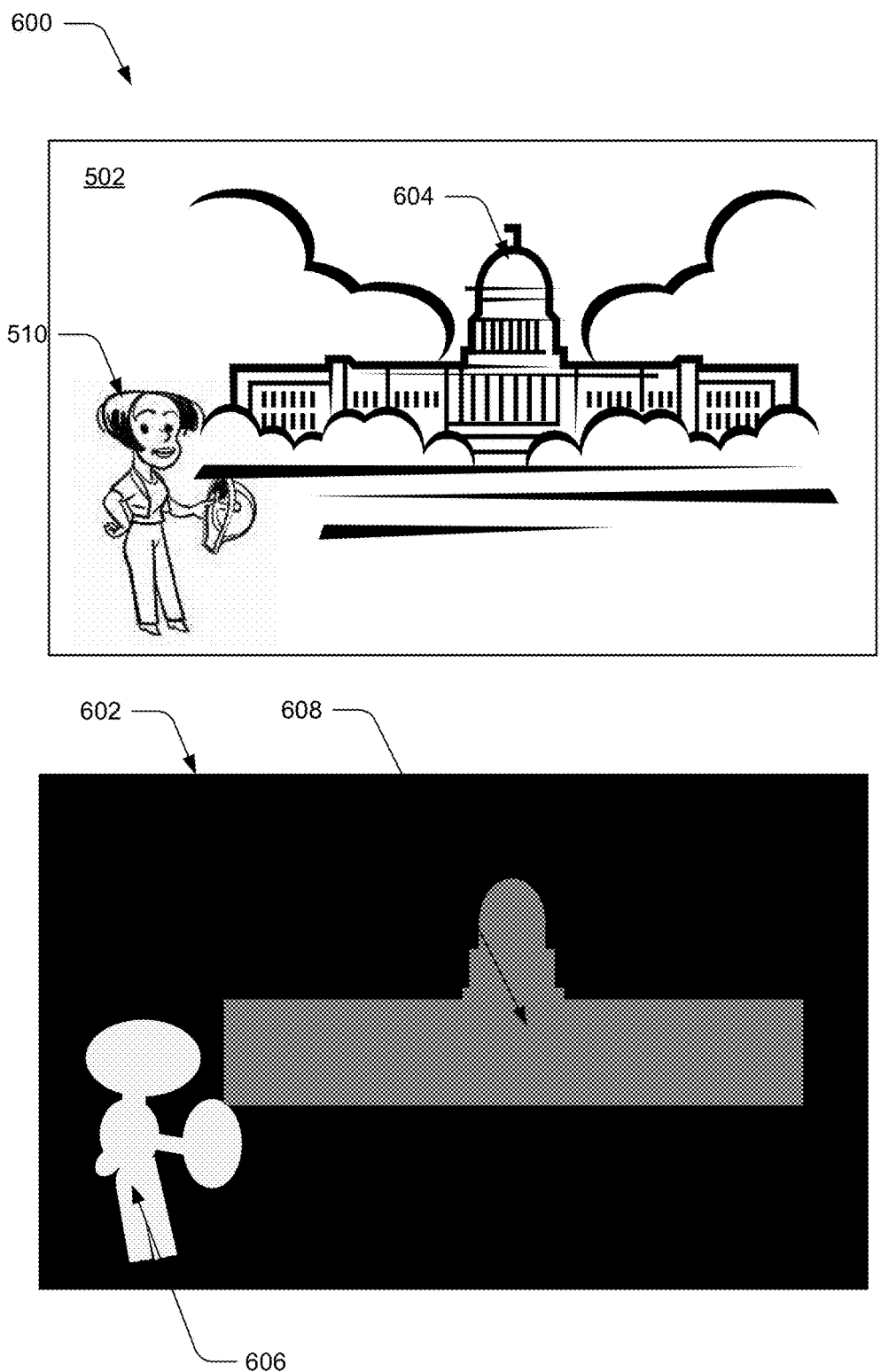
FIG. 6 illustrates an example of information derived from an image that may be used to crop the image according to content preservation characteristics.

FIG. 6 illustrates an example of information derived from an image that may be used to crop the image according content preservation characteristics. In particular, FIG. 6 illustrates at 600 the image 502 from FIG. 5 and a representation 602 of one of the saliency maps that may be derived from the image 502 (e.g., the base saliency map). As noted in the discussion of FIG. 5, the image 502 includes the person 510. The image 502 also includes monument 604. In the representation 602 of the saliency map, the person 510 is represented by corresponding shape 606 and monument 604 is represented by corresponding shape 608. The corresponding shapes 606, 608 in the representation 602 of the saliency map indicate that the person 510 and the monument 604 are salient (e.g., important) content of image 502. Consequently, a cropping of image 502 that includes both the person 510 and the monument 604 may have a higher (better) content preservation score than a cropping that includes neither the person 510 nor the monument 604, or a cropping that includes just one of them. In other words, a cropping that incorporates more salient content than another cropping will have a higher content preservation score. Methods other than determining ratios of a candidate cropping $C_i$'s salient content as determined from a respective map to the original image's salient content determined from the respective map may be used to calculate a content preservation score without departing from the scope of the techniques described herein.

Boundary Simplicity Module

The boundary simplicity module 208 represents functionality to determine a measure of simplicity of a cropping's boundary. Given multiple croppings of an image, the boundaries of croppings are likely to cut through objects included in the image. When the boundary of a cropping cuts through objects of an image the result may be a cropping that is visually unpleasant. Consequently, cropping boundaries that pass through simple regions of an image are preferred to those that pass through complex regions.

The boundary simplicity module 208 may use boundary regions that are determined for a candidate cropping to compute its boundary simplicity score. Consider an example in which the image 302 represents a candidate cropping of a larger image. Accordingly, the boundary regions 304, 306, 308, 310 may correspond to the boundary regions used by the boundary simplicity module 208 to compute the boundary simplicity score. To compute the overall boundary simplicity score $S_{BS}^i$, the boundary simplicity module 208 may compute boundary simplicity scores for each boundary region of the crop border using corresponding saliency maps (e.g., computed in a similar manner to the intermediate saliency maps discussed above). Given the saliency maps computed for each of the cropping's boundary regions, the boundary simplicity module 208 may compute the overall boundary simplicity score $S_{BS}^i$ as follows:

$$S_{BS}^i = \frac{\sum_{j=1}^{4} A_j^i}{4}$$

In this formula, the crop borders may be denoted by $\{S_b^k: k=1, 2, 3, 4\}$, where "1" corresponds to the top boundary region of the candidate cropping, "2" corresponds to the bottom boundary region of the candidate cropping, "3" corresponds to the left boundary region of the candidate cropping, and "4" corresponds to the right boundary region of the candidate cropping. Further, the term $A_j^i$ represents the average saliency value in the corresponding boundary region of the candidate cropping.

Figure 7:
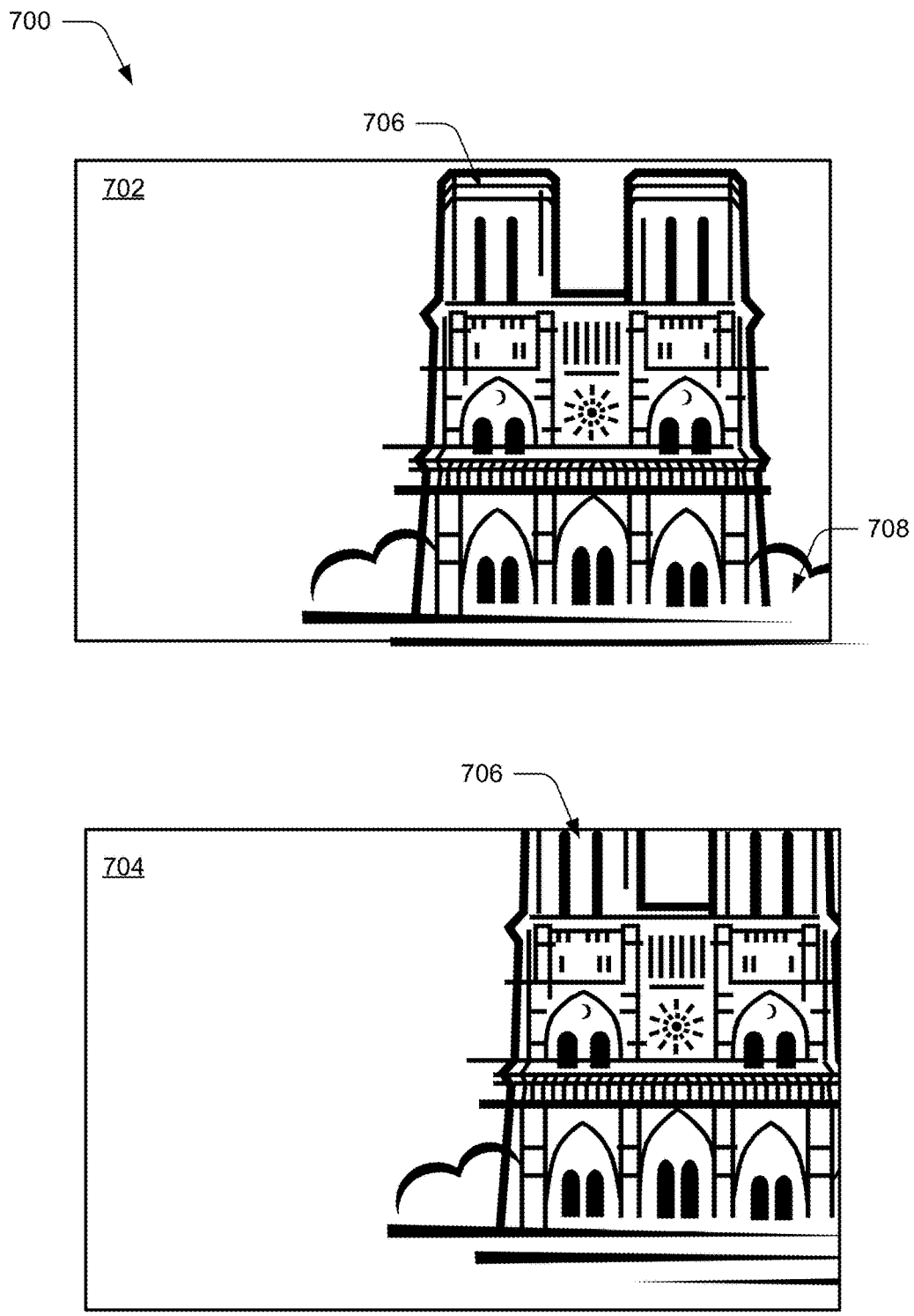
FIG. 7 illustrates examples of image croppings having different boundary simplicity characteristics.

FIG. 7 illustrates at 700 examples of image croppings having different boundary simplicity characteristics. Croppings 702, 704 represent different candidate croppings of an image (not shown). Further, both croppings 702, 704 include church 706. However, the boundary of cropping 702 may be considered to be simpler than that of cropping 704. This is because the boundary of cropping 704 cuts through both towers of the church 706 and cuts through the side of the church 706. In contrast, the boundary of cropping 702 does not cut through portions of the church 706. Instead, the boundary of cropping 702 appears to cut mostly through space and through some bushes 708. In any case, the boundary of cropping 702 cuts through fewer distinct objects of the image than cropping 704. Consequently, cropping 702 is preferred to that of cropping 704, which would be reflected in the simplicity score $S_{BS}^i$ computed for each of these candidate croppings.

Once the composition quality module 204, the content preservation module 206, and the boundary simplicity module 208 have computed component scores for each of the candidate croppings, those croppings may be ranked and, based on the rankings, suggested to a user for selection.

Cropping Selection Module

The cropping selection module 210 represents functionality to select and suggest one or more candidate croppings for which component scores have been computed. In one or more implementations, the cropping selection module 210 may rank candidate croppings as a function of the composition quality of the cropping, the content preservation of the cropping, and/or the boundary simplicity of the cropping. For example, the cropping selection module 210 may initially rank the candidate croppings according to each of the component scores. In this way, each candidate cropping may have a first ranking associated with its composition quality score $R_{Comp}^i$, a second ranking associated with its content preservation score $R_{CP}^i$, and a third ranking associated with its boundary simplicity score $R_{BS}^i$. Given these rankings, the cropping selection module may compute an average ranking of a given candidate cropping C, according to the following:

$$R_i = W_{Comp} \cdot R_{Comp}^i + W_{CP} \cdot R_{CP}^i \cdot W_{BS} \cdot R_{BS}^i$$

In the equation above, the terms $W_{Comp}$, $W_{CP}$, and $W_{BS}$ are weights applied respectively to the individual rankings $R_{Comp}^i$, $R_{CP}^i$, and $R_{BS}^i$. These weights may be learned by the cropping selection module 210 over time, e.g., as part of training the model with the well-composed images, based on which croppings suggested to a user are selected by the user, and so on. These weights may also be set by a user according to personal preference. For example, a user may give more importance to the composition of a cropping. Accordingly, the user may select to more heavily weight $R_{Comp}^i$. If a user finds that it is important for a cropping to preserve the content of an image or to have a simple boundary, however, the user may select to more heavily weight $R_{CP}^i$ or $R_{BS}^i$.

Although the equation specified above to compute the average ranking $R_i$ has a linear functional form, the cropping selection module 210 may also be configured to compute the average ranking using a non-linear function (not shown). Furthermore, the cropping selection module 210 may be configured to compute the average ranking for an image cropping using a subset of the composition quality of the cropping, the content preservation of the cropping, and the boundary simplicity of the cropping. For example, the cropping selection module 210 may compute $R_i$ as a function of just its composition quality and boundary simplicity. Alternately, the cropping selection module 210 may compute $R_i$ as a function of just a single parameter, e.g., a function of just the composition quality, just the content preservation, or just the boundary simplicity. In one or more implementations, the cropping selection module 210 may compute $R_i$ using parameters in addition to the individual rankings $R_{Comp}^i$, $R_{CP}^i$, and $R_{BS}^i$.

In one or more implementations, the cropping selection module 210 may also consider regions of interest when ranking the candidate croppings. By way of example and not limitation, regions of interest in an image may include a region of the image that a user has indicated should be included in a cropping of the image, one or more objects (e.g., faces) that are automatically detected in the image without user interaction, and so on. Through a user interface, a user may not only be able to designate regions of an image to keep in a suggested cropping, but may also be able to designate regions of the image to remove, e.g., so that the regions-to-remove do not appear in suggested croppings. Consequently, the cropping selection module 210 may select croppings for suggestion based on a preference toward croppings that include more of the regions-to-keep and fewer of the regions-to-remove.

When at least one region of interest (e.g., a region-to-keep or region-to-remove) has been designated, the cropping selection module 210 may compute the average ranking of the croppings in a different manner than specified above. In particular, the cropping selection module 210 may compute the average rankings based in part on a region of interest score $S_{ROI}^i$. The region of interest score $S_{ROI}^i$ represents the extent to which a given cropping preserves regions-to-keep and excludes regions-to-remove. When the region of interest score is used, the cropping selection module 210 may compute the average ranking of a cropping as follows:

$$R_i = W_{Comp} \cdot R_{Comp}^i + W_{CP} \cdot R_{CP}^i + W_{BS} \cdot R_{BS}^i + W_{ROI} \cdot S_{ROI}^i$$

In this expression, the term $W_{ROI}$ is a weight applied to the region of interest score $S_{ROI}^i$. The cropping selection module 210 may compute the $S_{ROI}^i$ according to the following:

$$S_{ROI}^i = \begin{cases} 1, & S_1^i = 1 \\ S_1^i + S_2^i \cdot 10^{-1} + S_3^i \cdot 10^{-2}, & \text{otherwise} \end{cases}$$

The term $S_1^i$ represents a ratio of how many complete regions-to-keep (RK) a cropping includes and complete regions-to-remove (RR) the cropping excludes to a total number of RKs and RRs. The cropping selection module 210 may compute $S_1^i$ as follows:

$$S_1^i = \frac{\text{number of } RKs \text{ completely included in } C_i + \text{number of } RRs \text{ completely outside } C_i}{\text{total number of } RKs + \text{total number of } RRs}$$

The term $S_2^i$ represents a ratio of how much area a cropping includes of the RKs and excludes of the RRs to the total area of the RKs and RRs. The cropping selection module 210 may compute $S_2^i$ as follows:

$$S_2^i = \frac{\text{sum of area of } RKs \text{ covered by } C_i + \text{sum of area of } RRs \text{ NOT covered by } C_i}{\text{total area of } RKs + \text{total area of } RRs}$$

The term $S_3^i$ represents a measure of how centered RKs are in a given cropping. The cropping selection module 210 may compute $S_3^i$ as follows:

$$S_3^i = \begin{cases} \exp\left(-\frac{\min_j dist(C_i, RK_j)}{\sigma^2}\right) & \text{at least 1 } RK \text{ is labeled} \\ 0 & \text{otherwise} \end{cases}$$

In this expression, the term $dist(C_i, RK_j)$ represents the center distance between $C_i$ and $RK_j$. This is but one way the average ranking $R_i$ may be calculated to indicate how well a cropping includes regions-to-keep and excludes regions to remove. It should be appreciated that a score indicative of how well a cropping preserves regions-to-keep and excludes regions-to-remove may be calculated in other ways without departing from the scope of the techniques described herein.

In any case, once the average ranking $R_i$ of each candidate cropping of an image is computed, the cropping selection module 210 may select top ranked croppings using a non-maximum suppression technique. Without using such a technique, the croppings suggested may be similar in terms of appearance, one cropping to another, and thus redundant. Although the second "best" cropping may, based on the average ranking, be the second most visually pleasing cropping, it may not be appreciably different from best cropping. This is because the second best cropping may be taken from a similar sub-region of an image as the best cropping, and therefore include much of the same content, in substantially a same location. In other words, the second best cropping may be ranked highly for the same reasons that the best cropping is ranked highly. Accordingly, the cropping selection module 210 may perform techniques that avoid suggesting redundant croppings. Instead, croppings may be suggested that have different visual characteristics from the best cropping.

To select visually pleasing but non-redundant croppings, the cropping selection module 210 may discard some image croppings (e.g., those having an average rank that is relatively worse than other croppings) so that just a number N of croppings remain for consideration. The cropping selection module 210 may then cluster the N remaining croppings, e.g., by performing greedy clustering of the N remaining cropping s using Intersection Over Union (IOU) and a predefined difference threshold γ in the clustering. Once the croppings are clustered, the cropping selection module 210 may sequentially select the highest ranked cropping in each cluster for suggestion to a user.

By way of example, the cropping selection module 210 may sort a set of croppings $C=\{C_i: i=1, \ldots, N\}$ in ascending order according to the average ranking of each cropping. From the croppings in the set C, it is assumed that the cropping selection module 210 selects a subset of those croppings for suggestion, such that the subset has a number of selected croppings n that is less than or equal to the number of croppings N of the set.

To perform the greedy clustering of the set of croppings, the cropping selection module 210 begins with a list of clusters T that initially includes no clusters, e.g., the list of clusters is initially set to the empty set Ø. Until each cropping in the set of croppings C is placed in a cluster, the cropping selection module 210 may form clusters of cropping s according to the following:

$$Q_r = \{C \in C : IOU(C, C_1) \leq \gamma\}$$

In this expression, the term $Q_r$ represents a cluster of croppings taken from the croppings that have not yet been clustered. The cluster $Q_r$ is made to include a best ranked unclustered cropping $C_1$ and croppings for which the IOU with the best ranked unclustered cropping is less than or equal to the difference threshold $\gamma$. In other words, $Q_r$ is made to include the best ranked unclustered cropping $C_1$. The cluster $Q_r$ is also made to include other not-yet-clustered croppings that, based on the comparison to the threshold, are "not different enough from" or are "too similar to" the best ranked unclustered cropping to be placed in another cluster.

Once each of the croppings in the set of croppings is found that is "not different enough from" or "too similar to" the best ranked unclustered cropping, the cluster $Q_r$ is added to the cluster list T. This process of forming a cluster is then repeated with the remaining not-yet-clustered croppings, e.g., the best ranked unclustered cropping is chosen for the next cluster and the remaining croppings that are not different enough from that cropping are also chosen for the next cluster. The cropping selection module 210 may perform this clustering until each of the croppings in the set of croppings has been clustered.

After the croppings have been clustered, the cropping selection module 210 may sequentially select a highest ranked cropping in each cluster of the list of clusters T until n croppings have been chosen. If the number of croppings to be selected n for suggestion is greater than the number of clusters in the list of clusters T, then the cropping selection module 210 returns back to the first cluster (e.g., the one having the cropping with the highest ranking overall) to also select the second highest ranked cropping in the cluster. The cropping selection module 210 may continue with this process until the cropping selection module has selected the number of croppings that are to be selected for suggestion.

Once croppings are selected from among the candidate croppings, they may be presented to a user. The croppings may be suggested through a user interface of a photo-editing application, for example. To do so, the user interface of the photo-editing application may present cropping windows over the image that is to be cropped as in FIG. 5. Through the user interface, a user may select a suggested cropping. The image may then be cropped according to and as a result of the selection. The user interface may also enable a user to select more than one suggested cropping. When multiple croppings are selected, the multiple selected croppings may be effective to create multiple resulting images (e.g., separate image files).

Additionally, croppings may be suggested through a user interface used to view a scene in real-time. For example, a device (e.g., a camera, a phone, and so on) may display a particular interface for capturing images. In addition to including the scene that is to be captured, the user interface may also display suggested croppings of the scene. The user interface may enable a user to select one of those croppings. As a result of the selection, the device (e.g., the camera, the phone, and so on) may capture an image of the scene according to the selected cropping. The user interface may also be configured to instruct a user to perform actions with the device to enable the device to capture an image according to a suggested cropping. For example, the user interface may instruct the user to zoom in, zoom out, pan left, pan right, pan up, pan down, adjust the exposure level, and so on. Once the user has performed such actions, the user interface may then present windows that indicate the suggested croppings, and enable the user to select a suggested cropping to capture the image according to the selected cropping.

Having discussed example details of the techniques for image cropping suggestion using multiple saliency maps, consider now some example procedures to illustrate additional aspects of the techniques.

Example Procedures

This section describes example procedures for image cropping suggestion using multiple saliency maps in one or more implementations. Aspects of the procedures may be implemented in hardware, firmware, or software, or a combination thereof. The procedures are shown as a set of blocks that specify operations performed by one or more devices and are not necessarily limited to the orders shown for performing the operations by the respective blocks. In at least some implementations the procedures may be performed by a suitably configured device, such as example computing devices 102, 202 of FIGS. 1 and 2 that make use of an image saliency module 110 and an image cropping module 112.

Figure 8:
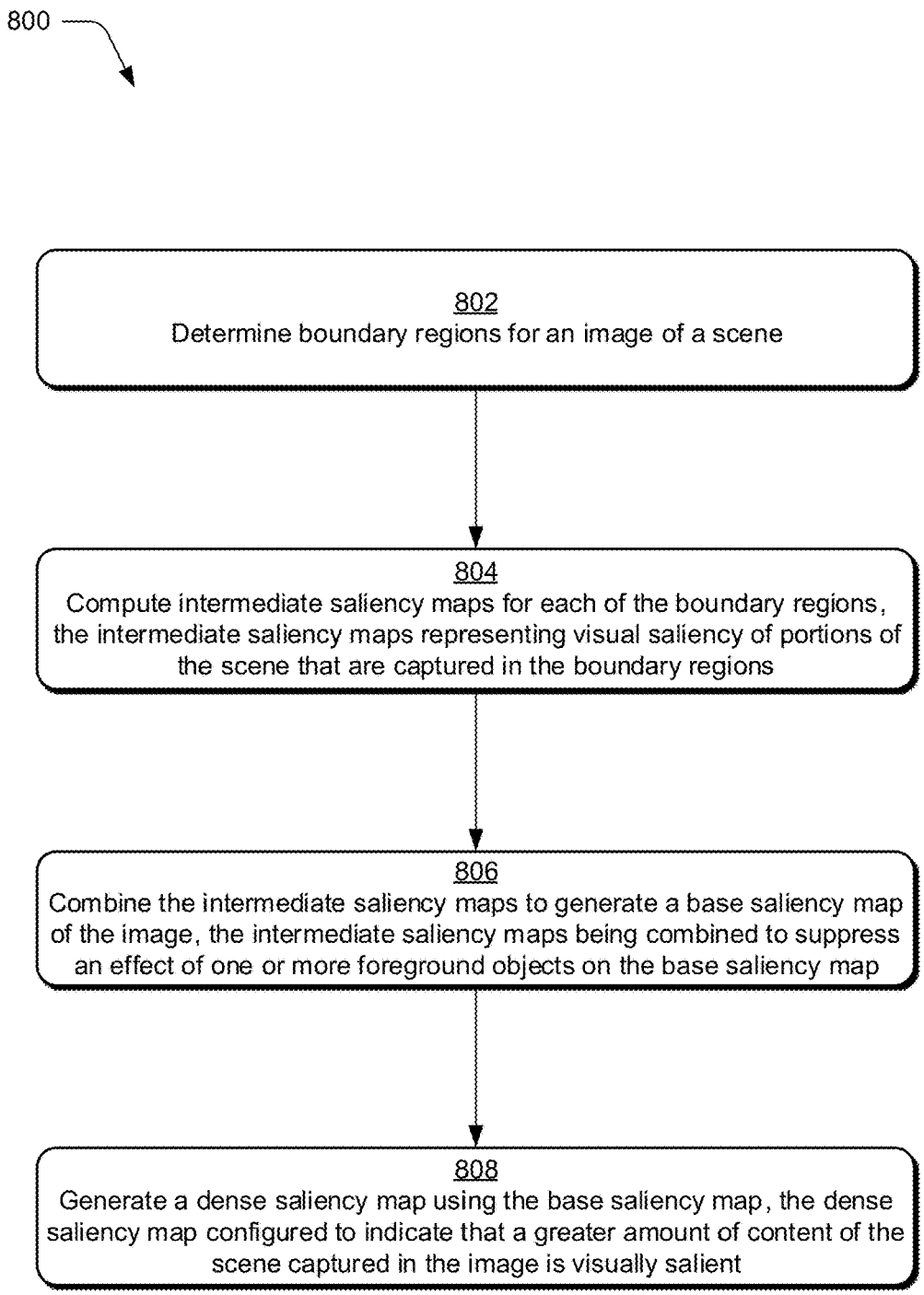
FIG. 8 is a flow diagram depicting a procedure in an example implementation in which a saliency map of an image is generated from saliency maps computed for boundary regions of the image.

FIG. 8 depicts an example procedure 800 in which a saliency map of an image is generated from saliency maps computed for boundary regions of the image. Initially, boundary regions are determined for an image (block 802). By way of example, the image saliency module 110 determines boundary regions 304, 306, 308, 310 for image 302, which correspond to a top boundary, bottom boundary, left boundary, and right boundary of the image 302 respectively. It should be appreciated that the image saliency module 110 may determine other boundary regions for the image 302, such as boundary regions 402, 404, 406, 408.

Once boundary regions for the image have been determined, intermediate saliency maps are computed for each of the boundary regions (block 804). The intermediate saliency maps represent visual saliency of portions of the scene captured in the boundary regions. For example, the image saliency module 110 computes an intermediate saliency map for each of the boundary regions 304, 306, 308, 310.

To compute an individual intermediate saliency map for a particular boundary region (e.g., a saliency map for one of the boundary regions 304, 306, 308, 310), the image saliency module 110 computes an average color of pixels contained in the particular boundary region. In particular, the image saliency module 110 computes a sample mean of the pixels contained in the particular boundary region in a given color space (e.g., the sample RGB mean). Along with the sample mean, the image saliency module 110 computes a sample covariance matrix for the pixels contained in the particular boundary region. The sample covariance matrix is used by the image saliency module 110 to whiten the feature space of the particular boundary region. The image saliency module 110 then calculates saliency values for each of the pixels contained in the particular boundary region based on a whitened distance (e.g., Euclidean distance) from the average color (e.g., the sample mean). The image saliency module 110 then uses the saliency values calculated for each pixel of the particular boundary region to form the intermediate saliency map for that region.

Once computed for each of the boundary regions, the intermediate saliency maps are combined to generate a base saliency map of the image (block 806). Further, the intermediate saliency maps are combined to suppress an effect of some foreground objects on the base saliency map. In particular, the combining is configured to suppress the effect of foreground objects that occupy a majority of one of the boundary regions. By way of example, the image saliency module 110 combines the intermediate saliency maps computed at block 804 to generate a base saliency map for the image 302. The manner in which these intermediate saliency maps are combined is configured to suppress the effect of any foreground objects that occupy a majority of boundary regions 304, 306, 308, 310.

Consider an example in which a foreground object captured in the image 302 occupies a majority of the boundary region 306. The manner in which the image saliency module 110 combines the intermediate saliency maps is configured to suppress an effect of that foreground object on the base saliency map generated for the whole image. In this way, the foreground object occupying the majority of the boundary region 306 does not have undue influence on generation of the base saliency map.

Using the base saliency map, a dense saliency map is generated (block 808). The dense saliency map is configured to indicate that a greater amount of content of the scene captured in the image is visually salient. By way of example, the image saliency module 110 generates a dense saliency map using the base saliency map computed at block 806. To do so, the image saliency module 110 may combine single-channel saliency maps computed for the image with the base saliency map. The base saliency map may be computed for a given color space such as RGB, and the single-channel saliency maps computed for each color channel of the color space, e.g., one saliency map for each of the red channel, green channel, and blue channel. To generate the dense saliency map, the image saliency module 110 uses a weighted average to combine the base saliency map with the three single-channel color maps as discussed in more detail above.

Figure 9:
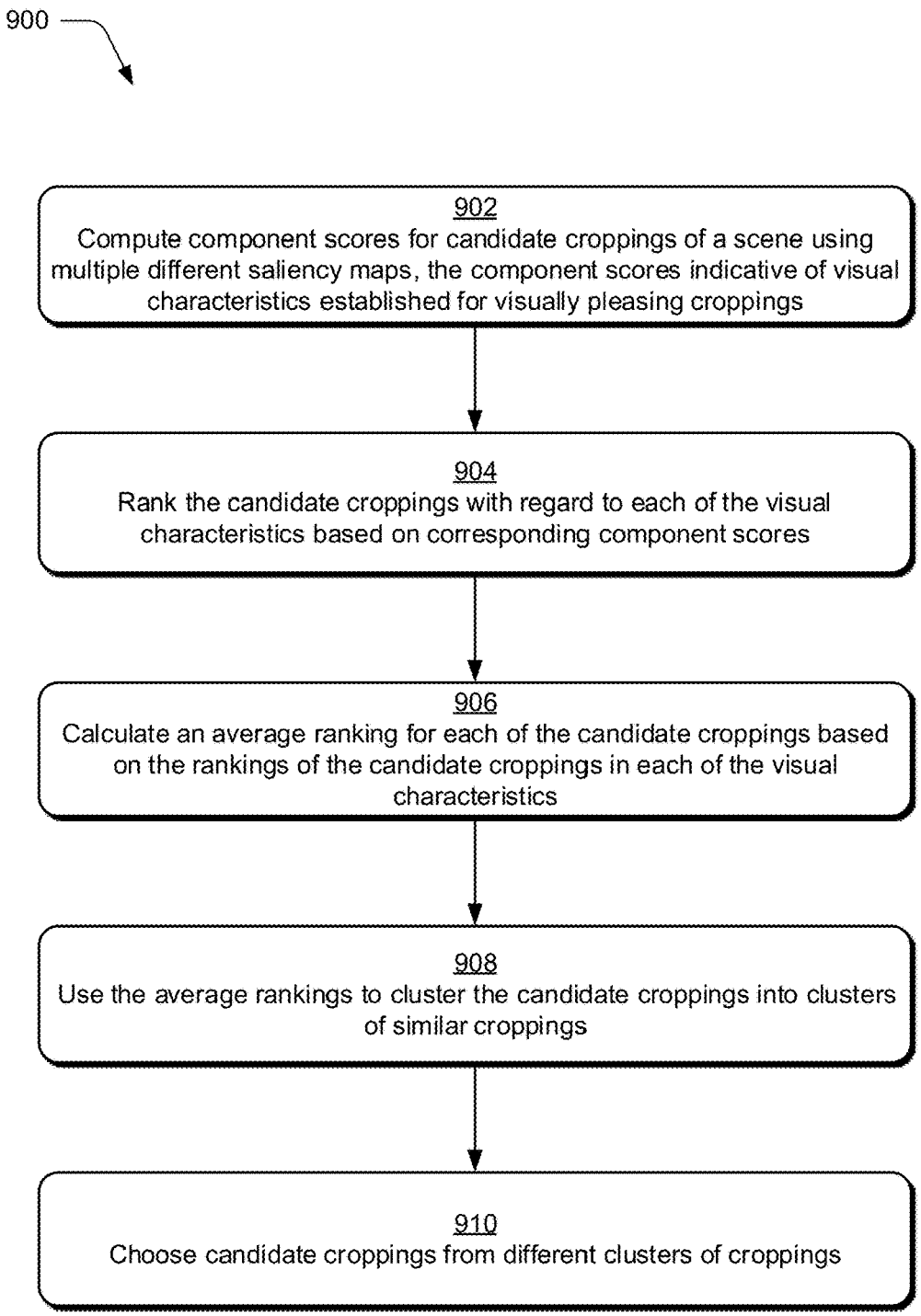
FIG. 9 is a flow diagram depicting a procedure in an example implementation in which scores indicative of visual characteristics are computed for candidate image croppings of a scene using multiple saliency maps and in which candidate image croppings are suggested to a user for selection.

FIG. 9 depicts an example procedure 900 in which scores indicative of visual characteristics are computed for candidate image cropping s of a scene using multiple saliency maps, and in which candidate image croppings are suggested to a user for selection. Once the candidate croppings of a scene are derived, component scores are computed for those croppings using multiple different saliency maps (block 902). The component scores are indicative of visual characteristics established for visually pleasing croppings. For example, the image cropping module 112 employs the composition quality module 204, the content preservation module 206, and the boundary simplicity module 208 to provide component scores for each of the candidate image croppings. Each of these modules computes a component score for a given cropping that is indicative of visual characteristics of the cropping. Moreover, each of the modules is configured to use multiple different saliency maps to do so.

The composition quality module 204, for instance, provides a component score indicative of a candidate cropping's composition quality (e.g., whether the candidate cropping includes features associated well-composed images or not). To compute this component score, the composition quality module 204 uses a dense saliency map and a saliency edge map. The content preservation module 206 provides a component score indicative of a degree to which a candidate cropping preserves content of the image, and is computed using a base saliency map, a dense saliency map, and a row-normalized gradient map. The boundary simplicity module 208 provides a component score indicative of a boundary simplicity of a candidate cropping, and is computed using boundary edge maps for a top, bottom, left, and right boundary of the cropping (assuming a rectangular cropping).

Based on the component scores, the candidate image croppings are ranked with regard to each of the visual characteristics (block 904). Consider an example in which 100 croppings are derived for a given image. In this example, the image cropping module 112 employs the cropping selection module 210 to rank the image croppings from 1 to 100 (with 1 being the best ranked cropping and 100 being the worst ranked cropping) with regard to each of the visual characteristics. Accordingly, the cropping selection module 210 ranks the candidate croppings from 1 to 100 with regard to their composition quality scores. The cropping selection module 210 also ranks the candidate croppings from 1 to 100 with regard to their content preservation scores and from 1 to 100 with regard to their boundary simplicity scores. Thus, a candidate cropping could potentially have a composition quality ranking of 1, a content preservation ranking of 3, and a boundary simplicity score of 100.

For each of the candidate croppings, an average ranking is calculated based on the rankings of the candidate cropping in each of the visual characteristics (block 906). For example, the cropping selection module 210 calculates an average ranking of a given cropping using the rankings determined for the croppings at block 904. Continuing with the example in which a given candidate cropping has a composition quality ranking of 1, a content preservation ranking of 3, and a boundary simplicity score of 100, the cropping selection module 210 uses these rankings to compute an average ranking for that cropping.

Once the average ranking is calculated for each cropping, the candidate croppings are ordered according to average rankings and then clustered into clusters of similar croppings (block 908). For example, the cropping selection module 210 orders the 100 candidate croppings discussed in the example above from 1 to 100 using the average rankings. The cropping selection module 210 then clusters these croppings into groups of similar candidate image croppings. In particular, the cropping selection module 210 clusters the candidate image croppings such that croppings within a group are different, one cropping from another, by less than a threshold amount. Further, the candidate image croppings are clustered such that the croppings of one group are different from the croppings in another group by at least the threshold amount.

The candidate croppings are then chosen from the different clusters of croppings for suggestion to a user (block 910). For example, the cropping selection module 210 may choose a best ranked cropping (e.g., a cropping with the highest average ranking) from each of the clusters. By selecting from different clusters, it is ensured that the croppings suggested to a user are different by at least a threshold amount. Moreover, this avoids the situation where each of the suggested croppings has similar visual characteristics and is thus redundant to the cropping with the best ranking. The cropping selection module 210 repeats this process until a number of cropping candidates are chosen. In one or more implementations, the number of candidates chosen may be based on user input indicating how many croppings the user would like suggested. The number of candidates that are chosen may also be based on stored settings (e.g., configuration settings of an application).

Once the cropping selection module 210 chooses a number of croppings from among the candidate croppings, the chosen croppings are presented to a user through a user interface (not shown). The croppings may be presented, for instance, by overlaying cropping windows on the image that is to be cropped. The user interface may enable a user to cycle through the suggested croppings one at a time. Alternately, each of the suggested croppings may be presented through the user interface at a same time. When each of the suggested croppings is presented at the same time, the croppings may be distinguished, such as by making the cropping window of each cropping a different color, using a different pattern (e.g., dashed lines) for each of the croppings, and so on.

Through the user interface, a selection of an image cropping is received to apply a crop according to the selection. For example, a user may select one of the suggested croppings with a cursor. A user may also select one of the cropping s by cycling through the croppings using a first control (e.g., an arrow button) and then confirming that the cropping on which the user has stopped cycling is to be selected using another control (e.g., an "OK", "Enter", or "Return" button). Once a candidate cropping is selected, the cropping may be applied. For example, the image cropping module 112 crops the image according to the selected cropping by removing (or hiding) portions of the image outside of the selected cropping window and retaining the portions within.

Having described example procedures in accordance with one or more implementations, consider now an example system and device that can be utilized to implement the various techniques described herein.

Example System and Device

Figure 10:
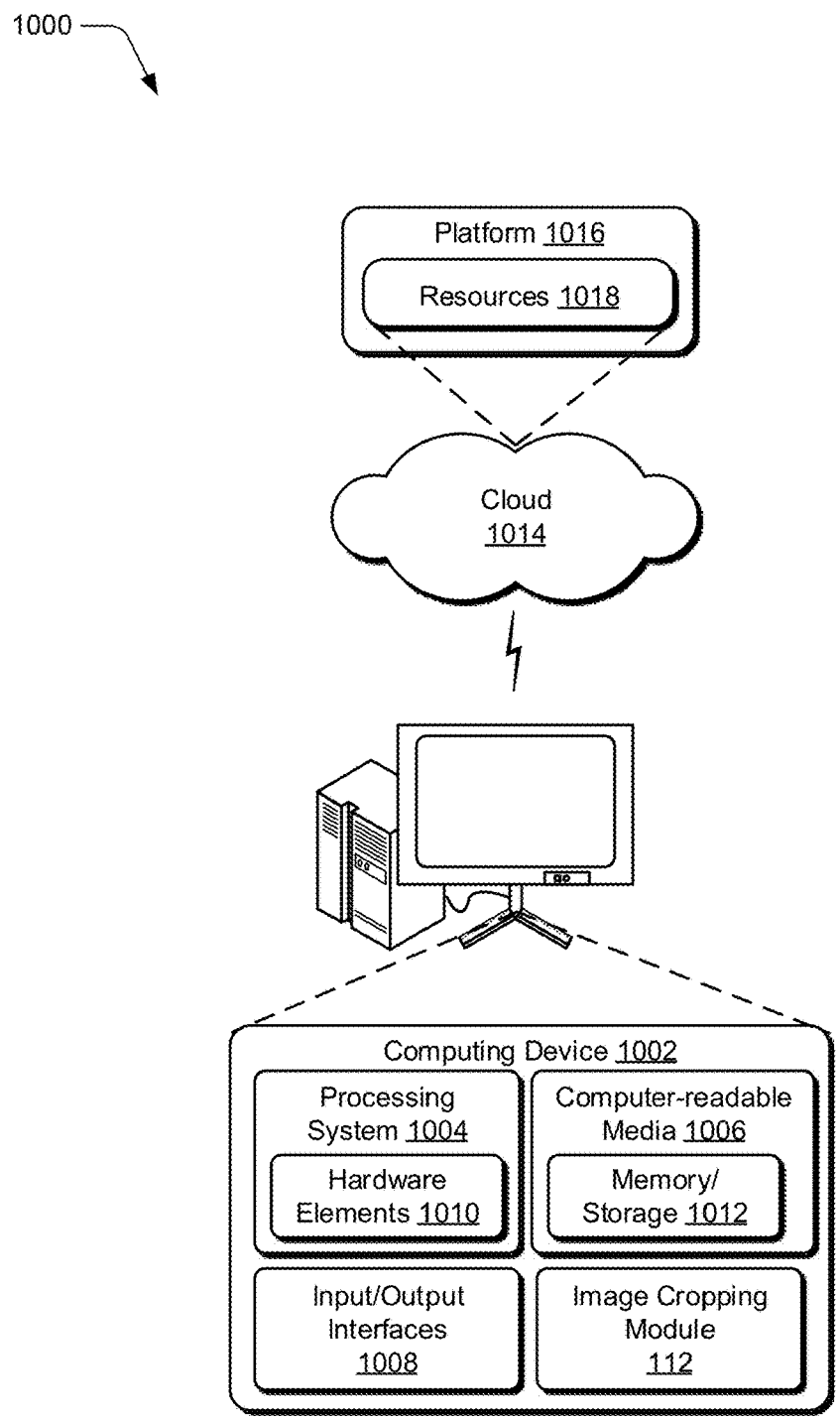
FIG. 10 illustrates an example system including various components of an example device that can be employed for one or more implementations of image cropping suggestion using multiple saliency maps that are described herein.

FIG. 10 illustrates an example system generally at 1000 that includes an example computing device 1002 that is representative of one or more computing systems and/or devices that may implement the various techniques described herein. This is illustrated through inclusion of the image cropping module 112, which operates as described above. The computing device 1002 may be, for example, a server of a service provider, a device associated with a client (e.g., a client device), an on-chip system, and/or any other suitable computing device or computing system.

The example computing device 1002 includes a processing system 1004, one or more computer-readable media 1006, and one or more I/O interfaces 1008 that are communicatively coupled, one to another. Although not shown, the computing device 1002 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1004 is representative of functionality to perform one or more operations using hardware. Accordingly, the processing system 1004 is illustrated as including hardware elements 1010 that may be configured as processors, functional blocks, and so forth. This may include implementation in hardware as an application specific integrated circuit or other logic device formed using one or more semiconductors. The hardware elements 1010 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 1006 is illustrated as including memory/storage 1012. The memory/storage 1012 represents memory/storage capacity associated with one or more computer-readable media. The memory/storage component 1012 may include volatile media (such as random access memory (RAM)) and/or nonvolatile media (such as read only memory (ROM), Flash memory, optical disks, magnetic disks, and so forth). The memory/storage component 1012 may include fixed media (e.g., RAM, ROM, a fixed hard drive, and so on) as well as removable media (e.g., Flash memory, a removable hard drive, an optical disc, and so forth). The computer-readable media 1006 may be configured in a variety of other ways as further described below.

Input/output interface(s) 1008 are representative of functionality to allow a user to enter commands and information to computing device 1002, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1002 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1002. By way of example, and not limitation, computer-readable media may include "computer-readable storage media" and "computer-readable signal media."

"Computer-readable storage media" refers to media and/or devices that enable persistent and/or non-transitory storage of information in contrast to mere signal transmission, carrier waves, or signals per se. Thus, computer-readable storage media does not include signals per se or signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" refers to a signal-bearing medium that is configured to transmit instructions to the hardware of the computing device 1002, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1010 and computer-readable media 1006 are representative of modules, programmable device logic and/or fixed device logic implemented in a hardware form that may be employed in some implementations to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 1010. The computing device 1002 may be configured to implement particular instructions and/or functions corresponding to the software and/or hardware modules. Accordingly, implementation of a module that is executable by the computing device 1002 as software may be achieved at least partially in hardware, e.g., through use of computer-readable storage media and/or hardware elements 1010 of the processing system 1004. The instructions and/or functions may be executable/operable by one or more articles of manufacture (for example, one or more computing devices 1002 and/or processing systems 1004) to implement techniques, modules, and examples described herein.

The techniques described herein may be supported by various configurations of the computing device 1002 and are not limited to the specific examples of the techniques described herein. This functionality may also be implemented all or in part through use of a distributed system, such as over a "cloud" 1014 via a platform 1016 as described below.

The cloud 1014 includes and/or is representative of a platform 1016 for resources 1018. The platform 1016 abstracts underlying functionality of hardware (e.g., servers) and software resources of the cloud 1014. The resources 1018 may include applications and/or data that can be utilized while computer processing is executed on servers that are remote from the computing device 1002. Resources 1018 can also include services provided over the Internet and/or through a subscriber network, such as a cellular or Wi-Fi network.

The platform 1016 may abstract resources and functions to connect the computing device 1002 with other computing devices. The platform 1016 may also serve to abstract scaling of resources to provide a corresponding level of scale to encountered demand for the resources 1018 that are implemented via the platform 1016. Accordingly, in an interconnected device implementation, implementation of functionality described herein may be distributed throughout the system 1000. For example, the functionality may be implemented in part on the computing device 1002 as well as via the platform 1016 that abstracts the functionality of the cloud 1014.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method implemented by a computing device, the method comprising:
    obtaining input to initiate cropping of a scene;
    computing multiple different saliency maps from an image of the scene; and
    generating one or more suggested image croppings of the scene based on rankings assigned to multiple candidate croppings of the scene, wherein the rankings reflect an assessment of:
        composition quality of the multiple candidate croppings, the assessment of the composition quality performed using a first combination of the multiple different saliency maps;
        degrees of preservation of content appearing in the scene for the multiple candidate croppings, the assessment of the degrees of preservation of content performed using a second combination of the multiple different saliency maps; and
        boundary simplicity of the multiple candidate croppings, the assessment of the boundary simplicity performed using a third combination of the multiple different saliency maps.

2. A method as described in claim 1, wherein the first combination of saliency maps includes:
    a dense saliency map that combines a saliency map computed from red, green, blue (RGB) information of the image and single-channel saliency maps computed for each color channel of the RGB information; and
    a saliency edge map computed using the dense saliency map and a gradient magnitude map that indicates, for each pixel of the image, an amount the image is changing at the pixel relative to other pixels.

3. A method as described in claim 1, wherein the second combination of saliency maps includes:
   a base saliency map that is computed from RGB information of the image;
   a dense saliency map that combines the base saliency map and single-channel saliency maps computed for each color channel of the RGB information; and
   a row-normalized gradient map that is computed by applying a threshold to pixel values of a gradient magnitude map and then normalizing the pixel values of the gradient magnitude map by row, the gradient magnitude map configured to indicate, for each pixel of the image, an amount the image is changing at the pixel relative to other pixels.

4. A method as described in claim 1, wherein the third combination of saliency maps includes edge saliency maps computed for each of:
   a left edge boundary region of the cropping;
   a right edge boundary region of the cropping;
   a top edge boundary region of the cropping; and
   a bottom edge boundary region of the cropping.

5. A method as described in claim 1, wherein generating the one or more suggested image croppings includes clustering the multiple candidate croppings into clusters of similar candidate croppings based on the assessment.

6. A method as described in claim 5, further comprising selecting the one or more suggested image croppings based on being ranked highest in a respective cluster.

7. A method as described in claim 5, further comprising selecting the one or more suggested image croppings from different clusters.

8. A method as described in claim 5, wherein the candidate croppings in one cluster are different from the candidate croppings in another cluster by at least a threshold amount.

9. A method as described in claim 5, wherein the candidate croppings in a given cluster are different, one candidate cropping from another, by less than a threshold amount.

10. A system comprising:
   one or more modules implemented at least partially in hardware, the one or more modules configured to perform operations comprising:
      displaying, via a user interface, one or more suggested croppings of a scene, the suggested croppings being selected from a plurality of candidate croppings of the scene and selected for suggestion based on selection of the suggested cropping s from multiple clusters of the candidate croppings, each of the clusters having different candidate croppings from the candidate croppings in the other clusters by at least a threshold amount; and
      receiving, via the user interface, a selection of one of the one or more suggested croppings to apply a selected cropping of the scene.

11. A system as described in claim 10, wherein the operations further comprise:
   ranking each of the candidate croppings with regard to multiple different visual characteristics;
   calculating an average ranking for each of the candidate croppings based on the rankings of the candidate croppings in each of the different visual characteristics; and
   using the average rankings to cluster the candidate croppings.

12. A system as described in claim 10, wherein the operations further comprise selecting the suggested croppings from the multiple clusters of candidate croppings.

13. A system as described in claim 12, wherein the suggested croppings are selected from the multiple clusters of candidate croppings based on being ranked highest in a respective cluster.

14. A system as described in claim 10, wherein the candidate croppings in a given cluster are different, one candidate cropping from another, by less than the threshold amount.

15. A method implemented by a computing device, the method comprising:
   computing scores for candidate image croppings of a scene, the scores being indicative of visual characteristics ascertained from multiple different types of saliency maps of the scene; and
   selecting a highest-ranked image cropping from different clusters of the candidate image croppings that are clustered based on the computed scores.

16. A method as described in claim 15, further comprising ranking the candidate image croppings within a given cluster.

17. A method as described in claim 15, wherein the candidate image croppings in one cluster are different from the candidate image croppings in other clusters by at least a threshold amount.

18. A method as described in claim 15, wherein the candidate image cropping s in a given cluster are different, one candidate image cropping from another, by less than a threshold amount.

19. A method as described in claim 15, wherein the scores comprise multiple component scores that are computed for each candidate image cropping and are indicative of a different visual characteristic established for visually pleasing croppings.

20. A method as described in claim 19, wherein the component scores include at least one of:
   a composition quality score;
   a content preservation score; and
   a boundary simplicity score.

* * * * *

UNITED STATES PATENT AND TRADEMARK OFFICE
CERTIFICATE OF CORRECTION

PATENT NO.         : 10,346,951 B2
APPLICATION NO.    : 15/448138
DATED              : July 9, 2019
INVENTOR(S)        : Zhe Lin et al.

Page 1 of 1

It is certified that error appears in the above-identified patent and that said Letters Patent is hereby corrected as shown below:

Column 27, Line 46, after "the suggested", delete "cropping s", insert --croppings--, therefor.

Column 28, Line 39, after "image", delete "cropping s", insert --croppings--, therefor.

Signed and Sealed this
Eighteenth Day of February, 2020

Andrei Iancu
*Director of the United States Patent and Trademark Office*